United States Patent [19]
Cabrera et al.

[11] Patent Number: 6,029,160
[45] Date of Patent: Feb. 22, 2000

[54] METHOD AND MEANS FOR LINKING A DATABASE SYSTEM WITH A SYSTEM FOR FILING DATA

[75] Inventors: Luis Felipe Cabrera, San Jose; Inderpal Singh Narang, Saratoga; Robert Michael Rees, San Jose, all of Calif.

[73] Assignee: International Business Machines Corporation, Armonk, N.Y.

[21] Appl. No.: 08/921,770

[22] Filed: Aug. 15, 1997

Related U.S. Application Data

[63] Continuation of application No. 08/449,600, May 24, 1995, abandoned.

[51] Int. Cl.[7] .................................................. G06F 17/30
[52] U.S. Cl. ................................ 707/1; 707/10; 707/100; 707/104; 395/200.31; 395/200.33
[58] Field of Search .............................. 707/1, 100, 104, 707/102, 10; 395/200.31, 200.33

[56] References Cited

U.S. PATENT DOCUMENTS

| | | | |
|---|---|---|---|
| 4,354,269 | 10/1982 | Vries et al. | 371/43 |
| 4,587,628 | 5/1986 | Archer et al. | 364/900 |
| 4,817,050 | 3/1989 | Komatsu et al. | 364/900 |
| 4,868,733 | 9/1989 | Fujisawa et al. | 364/200 |
| 5,095,420 | 3/1992 | Eilert et al. | 395/400 |
| 5,237,661 | 8/1993 | Kawamura et al. | 395/250 |
| 5,241,648 | 8/1993 | Cheng et al. | 395/600 |
| 5,272,625 | 12/1993 | Nishihara et al. | 364/413.13 |
| 5,317,739 | 5/1994 | Elko et al. | 395/650 |
| 5,321,832 | 6/1994 | Tanaka et al. | 395/600 |
| 5,331,673 | 7/1994 | Elko et al. | 395/575 |
| 5,355,477 | 10/1994 | Strickland et al. | 395/600 |
| 5,361,203 | 11/1994 | Hiyama et al. | 364/413.13 |
| 5,390,328 | 2/1995 | Frey et al. | 395/650 |
| 5,522,066 | 5/1996 | Lu | 375/600 |
| 5,552,588 | 9/1996 | Schneider | 235/385 |

FOREIGN PATENT DOCUMENTS

| | | |
|---|---|---|
| 0 301 703 | 6/1988 | European Pat. Off. ......... G09G 1/00 |
| 0593341A1 | 10/1993 | European Pat. Off. ...... G06F 15/403 |
| 2089256 | 3/1929 | Japan . |
| 1-154278 | 1/1989 | Japan . |
| 2-266445 | 10/1990 | Japan . |
| 5-128167 | 5/1993 | Japan . |
| 6-149647 | 5/1994 | Japan . |
| 2184267 | 12/1985 | United Kingdom . |

OTHER PUBLICATIONS

B.G. Eligulashvili, "Retrieval Optimization in Inverted Files", Programming and Computer Software, vol. 13, No. 6, Nov.–Dec. 1987, pp. 268–271.

T.J. Meijler, et al, "Bridging The Boundaries Between Application: Providing Interactive Interoperablility For The End–User", First International Workshop on Interoperability in Multidatabase Systems, Apr. 1991, IEEE, pp. 338–341.

C.E. Clark et al, "Utilizing a Client's I/O Buffer to Stage Data to a Shared Cache", IBM Technical Disclosure Bulletin, vol. 35, No. 2, Jul. 1992, pp. 20–21.

K.P. Eswaran, "Locking Technique in a Relational Data Base: Locking on Intents", IBM Technical Disclosure Bulletin, vol. 18, No. 7, Dec. 1975, pp. 2324–2326.

(List continued on next page.)

*Primary Examiner*—Paul V. Kulik
*Assistant Examiner*—Frantz Coby
*Attorney, Agent, or Firm*—Gray Cary Ware Freidenrich

[57] ABSTRACT

Extensions to a database system provide linkage between data in the database system and files in a system for filing data which is external to the database system ("the filing system"). The linkage includes an external file reference (efr) data type which is defined in the database system for reference to files that are stored in the filing system. When entries are made in the database system that include efr data-type references to files in the filing system, control information is provided by the database system to the filing system. The control information causes the filing system to control processing of referenced files according to referential constraints established in the database system.

29 Claims, 10 Drawing Sheets

OTHER PUBLICATIONS

D. Cornell et al, "Integrated Site Assignment for Relations and Join Operations in Distributed Transaction Processing", IBM Technical Bulletin, vol. 32, No. 4A, Sep. 1989, pp. 306–314.

J.M. Munier et al, "Simple Way to Load and/or Start a Programmed Processor", IBM Technical Disclosure Bulletin, vol. 37, No. 06A, Jun. 1994, pp. 75–76.

N.J. King, "Dynamic Catalog Structure", IBM Technical Disclosure Bulletin, vol. 13, No. 6, Nov. 1970, pp. 1692–1695.

P.J. Ferguson et al, "Reference Code Development Process", vol. 30, No. 11, Apr. 1988, pp. 196–200.

R.A. Elmasri et al, "Entity–Relationship Approach—ER '93", 12th Int'l Conference on the Entity Relationship Approach Dec. 1993, pp. 364–375.

R.S. Lorie et al, "Compilation of Relational Data Statements", IBM Technical Disclosure Bulletin, vol. 22, No. 9, Feb. 1980, pp. 4181–4184.

D.G. Reed et al, "Accessing Data from Disk Files", IBM Technical Disclosure Bulletin, vol. 24, No. 10, Mar. 1992, pp. 4944–4945.

J.E. Gorman et al, "A New Approach to Relational Databases for CAD", 1984 IEEE International Symposium on Circuits and Systems Proceedings, pp. 981–985.

D. Isaac, "Hierarchical Storage Management for Relational Databases", Twelfth IEEE Symposium on Mass Storage Systems, Apr. 1993, pp. 139–144.

J.W. Huang, "Multibase: A Heterogeneous Multidatabase Management System", Eighteenth IEEE Annual International Computer Software & Applications Conference, Nov. 1994, pp. 332–339.

D. Rosenthal, Evolving the Vnode Interface, USENIX Summer Conference, Jun. 1990, pp. 107–117.

H. Ikeda, et al, Intervision: A New Hypermedia System Focusing on Dynamic Media, Database Systems for Advanced Applications, 1991, pp. 477–484.

H. Paijmans, Free Text Data Bases on Small Computers, RIAD 88 Program Proceedings, 1988, pp. 491–500.

S, Kleiman, Vnodes: An Architecture for Multiple File System Types in Sun Unix, 1986 Summer Usenix, pp. 237–247.

P. Taylor et al, Managing Data: HP 300 Files and Data Bases, Hewlett–Packard Journal, Jun. 1979, pp. 16–20.

M. Nagata, A Relational Image Data Base System for Remote Sensing, IEEE, 1981, pp. 491–496.

P. Selfriage, Raster Image File Format (RIFF): An Approach to Problems In Image Management, IEEE, 1979, pp. 540–555.

F. Aubry, et al, An Image Handling System for Medical Image Processing, SPIE, vol. 1137, Science and Engineering of Medical Imaging, 1989, pp. 131–139.

S. Coleman, et al, Mass Storage System Reference Model, Version 4, May, 1990, IEEE, pp. 1–38.

H. Deitel, Operating Systems, 1990, Chapter 13, File and Database Systems, pp. 387–417.

METHOD AND MEANS FOR LINKING A DATABASE SYSTEM WITH A SYSTEM FOR FILING DATA

This application is a continuation of application Ser. No. 08/1449,600, filed May 24, 1995, now abandoned.

BACKGROUND OF THE INVENTION

The invention relates generally to database systems and systems for filing data, and particularly to linkage between data stored in a database system and files stored in a file system that is external to the database system.

Generally, a file system is used to "file away" information which a user will later retrieve for processing. With reference to H. M. Deitel, OPERATING SYSTEMS (Second Edition, 1990), Chapter 13, a file system provides a user with the ability to create a file that is "a named collection of data". Normally, a file resides in directly accessible storage and may be manipulated as a unit by file system operations. As Deitel teaches, a file system affords a user the means for accessing data stored in files, the means for managing files, the means for managing direct access storage space where files are kept, and the means for guaranteeing the integrity of files. As is known, there is a class of applications where large data objects such as digitized movies, digitized images, digitized video, and computer-generated graphics are typically captured, processed, and stored in file systems.

With reference to the IEEE Mass Storage Systems Reference Model Version May 4, 1990, developed by the IEEE Technical Committee on Mass Storage Systems and Technology), a Mass Storage System is used to store and administer data objects known as "bitfiles". A bitfile is an uninterpreted sequence of bits, of arbitrary length, possessing attributes relating to unique identification, ownership, and other properties of the data present in the bitfile, such as its length, time of creation, and a description of its nature. A Mass Storage System is able to administer a hierarchy of storage devices for the storage of bitfiles to provide cost effective storage.

When used herein, a system for filing data (also, "a filing system") encompasses file systems and mass storage systems as defined above. The term "file" is hereafter used to denote data stored in a filing system.

C. J. Date, in AN INTRODUCTION TO DATABASE SYSTEMS (Sixth Edition, 1995), Chapter 1, defines a database system as "basically a computerized record-keeping system . . . ". The contents of a database system (records) are defined, organized, and accessed according to some scheme such as the well-known relational model.

A file management component of a file system normally operates at a level above an operating system; access to the contents of the file system requires knowledge at least of the identity of a file. A database system, on the other hand, operates at a level above a file management system. Indeed, as Date points out, a database management system (DBMS) component of a database system typically operates on top of a file management system ("file manager").

According to Date, while the user of a file system may enjoy the ability to create, retrieve, update, and destroy files, it is not aware of the internal structure of the file and, therefore, cannot provide access to them in response to requests that presume knowledge of such structure. In this regard, if the file system stores movies, the system would be able to locate and retrieve a file in which a digitized version of "The Battleship Potemkin" is stored, but would not be able to respond to a request to return the titles of all Russian-language movies directed by Sergei Eisenstein, which is well within the ability of a database system to do.

It may, therefore, be asked whether a database system might not be used to index and provide access to large objects in a file system (such as files that contain digitized versions of Russian-language movies). In fact, a database can provide such a capability. However, in order to provide access to files containing the large objects, the DBMS must possess the facilities to store indexed information of which the objects are composed. Manifestly, such functions would waste the resources of a general purpose database system set up to store, access, and retrieve relatively short objects such as records. Moreover, the raw content of a large object captured in a file system may be so vast as to be impractical to structure for a database request. Typically, features of such an object (such as a digitized image) would be extracted from the file, formatted according to the database system structure, and then used by the database system to support the search of stored objects based on the extracted features. See, for example, the query by image content (QBIC) system and method disclosed in U.S. patent application Ser. No. 07/973,474, filed Nov. 9, 1992 now abandoned, and U.S. patent application Ser. No. 08/216,986, filed Mar. 23, 1994 now U.S. Pat. No. 5,579,471, both of which are incorporated herein by reference.

Such system joinders, moreover, do not provide referential integrity for data stored by the database system. Relatedly, "referential integrity" refers to the guarantee that the database system will not contain any unmatched foreign key values. This guarantee is based upon the consistency of the contents and structure of a database system. Referential integrity guarantees, for example, that if a reference to a file titled "The Battleship Potemkin" is included in a database system response to a request to list all Russian-language movies directed by Sergei Eisenstein, the movie itself (or its digitized form) will exist in the file system and will be named identically in the database and file systems.

Accordingly, there is a need to link the power of a database system to search data records with the capacity of a file management system to store large data objects, while providing referential integrity to the linkage between the database system and the file management system.

SUMMARY OF THE INVENTION

The invention is based upon the inventors' critical realization that definition of a data type in the database system for reference to external files would support a robust linkage to the files in a filing system through which constraints that guarantee referential integrity in the database system can be applied to files in the filing system.

Therefore, a principal objective of this invention is to provide a link between the database of a database system and a filing system that is external to the database system.

A significant aspect of the objective is to apply referential constraints to the filing system contents in such a manner as to guarantee referential integrity with respect to files referenced by the database system.

Another objective of the invention is to provide a link between a database system and a filing system through which constraints guaranteeing referential integrity of the database system can be applied to the file system.

DETAILED DESCRIPTION OF THE PREFERRED EMBODIMENT

General Principles and Operations

Figure 1:
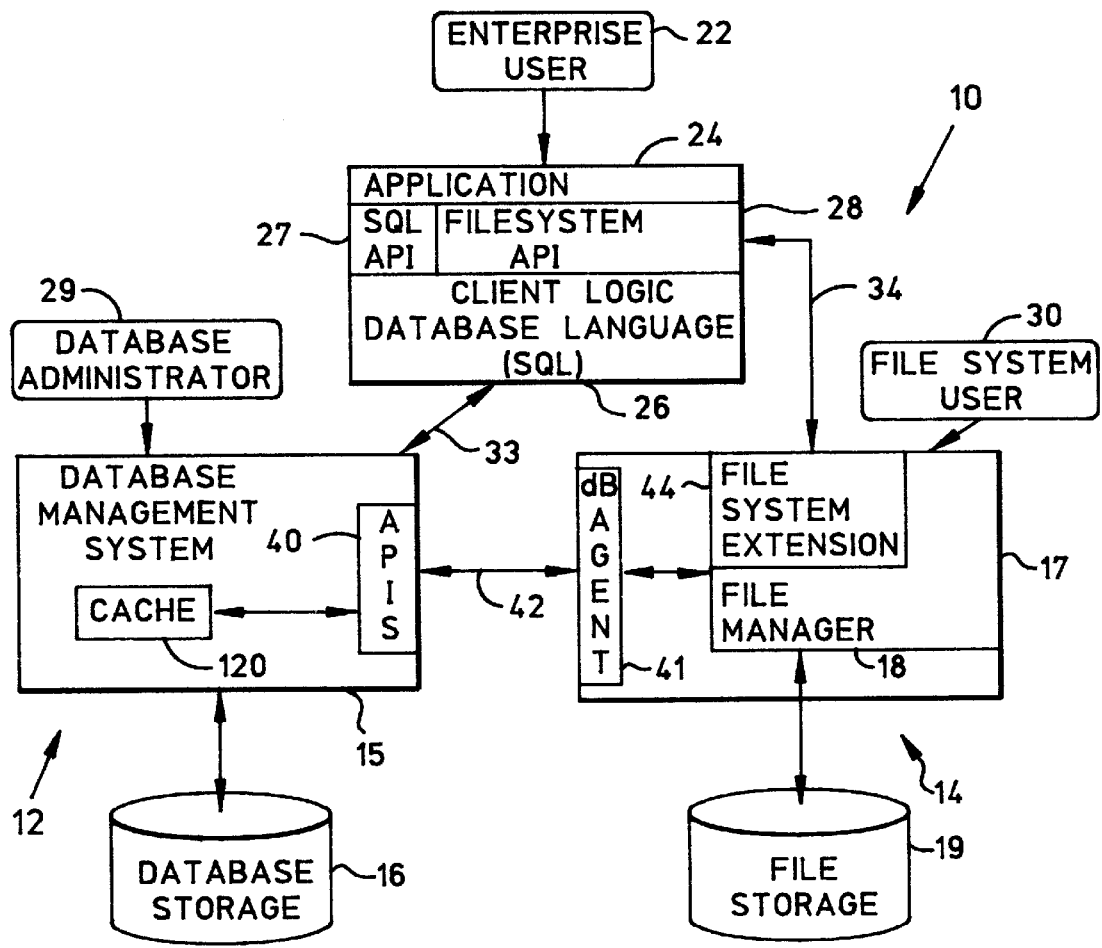
FIG. 1 is a block diagram illustrating an enterprise system architecture according to the invention.

FIG. 1 illustrates an enterprise, a large system complex including one or more processors performing functions that together achieve a common goal, with the processors being linked or coupled to the degree necessary to achieve the goal. The enterprise system is indicated generally by 10 and includes a database system 12 and a file system 14. The database system 12 includes a conventional database management system (DBMS) 15 that provides views of, and access to, a database kept on one or more database storage devices 16. The enterprise system 10 also includes a file system 14 with a file server 17 supporting a file manager 18 that provides storage of, and access to, files in file storage 19. An enterprise user 22 employs conventional processing means (such as a computer or workstation) to support an application program 24 that interfaces with client logic 26. Conventionally, the client logic 26 includes database language commands. A first interface is in the form of a database language application programming interface (API) 27 that operates conventionally between the application 24 and the client logic 26. In addition, the user processing configuration includes a second interface in the form of file system API 28 that provides the enterprise user 22 with access to the file system 14.

A database administrator 29 identifies data to be entered into the database system, decides form and content for the data, and, using a database language, sets up and fills the database. In this latter regard, the database administrator defines data entities and establishes the scheme that supports requests from the enterprise user.

Requests from the enterprise user 22 to the data system 12 and responses to requests are provided on a communication path 33 ("SQL communication path") between the user's processor and the DBMS 15. User requests include retrieval, updating, and deletion of data and addition of new data to the database.

The communication path 34 ("file communication path") between the file system API 28 and file manager 18 enables the enterprise user 22 to create, store, and request files in the file system 14.

In the practice of the invention, one or more application programming interfaces APIs 40 in the DBMS 15 and a database agent 41 in the file management system 17 are the respective terminals of a communication path 42 between the database system 12 and the file system 14 for exchange of information between the systems respecting files in the file system 14. Specifically, the communication path 42 provides the means by which the DBMS 15 provides control information to the file system 14 that causes the file system to control processing of files according to referential integrity constraints established at the database system 12. In this description, the communication path 42 is also referred to as the "control communication path."

The file system 14 may also be accessed by users such as the file system user 30 without the database system 12 as an intermediary.

Preferably, except for the communication path 42, the file system 14 operates independently of, and is external to, the database system 12; that is, its role is not to serve the DBMS 15 in accessing the database storage 16.

Figure 2:
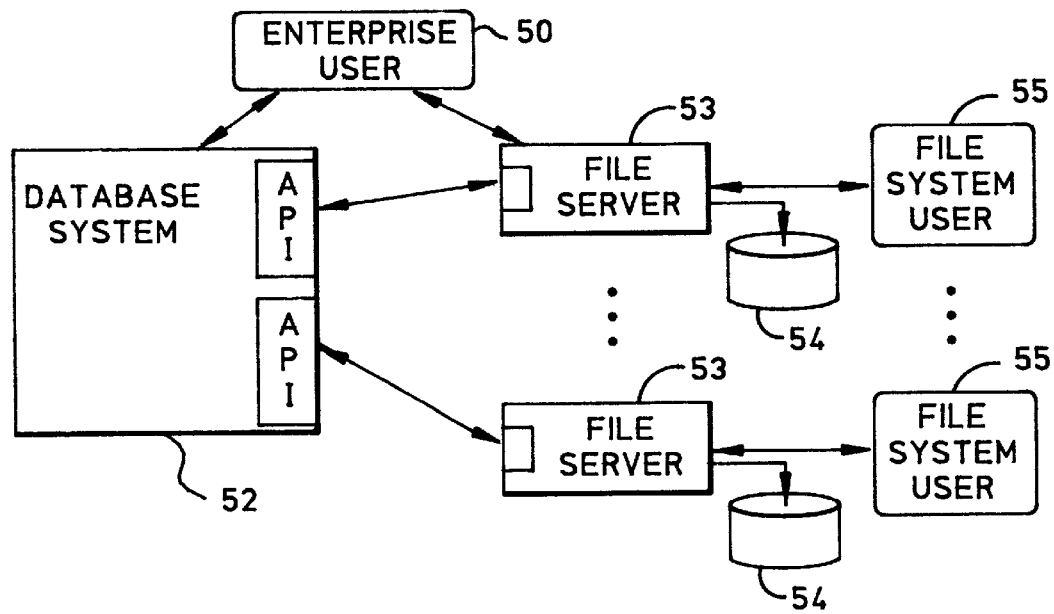
FIG. 2 is a block diagram illustrating a variant of the enterprise system architecture of FIG. 1 in which a file management system includes multiple file servers.

An alternate arrangement of an enterprise system is shown in FIG. 2, and includes an enterprise user 50 coupled to a database system 52 and to a distributed file system including a plurality of file servers 53 with disk storage 54 that may be accessed independently by a plurality of file system users 55.

In the discussion of the preferred embodiment which follows, it is assumed that the database system that will be discussed is a relational database system (RDBS) and that the database language used with it is SQL. However, it will be manifest to the reasonably skilled artisan that the principles of the invention are not limited to the combination of an RDBS or the SQL language with a file system. Indeed, teachings respecting the preferred embodiment are applicable to other database schemas and languages.

Further, the following discussion uses the term "file system" to denote a system of hardware and software that provides means for retrieval and management of files. When a file system resides in a node which is configured as network of computers, additional software can provide the local/remote transparency for file access. The file system and the additional software is then referred to as "the file server". The discussion assumes that a file server is a component of a particular kind of file system. This is not meant to limit the invention to being practiced only with file systems that include file servers.

Figure 3:
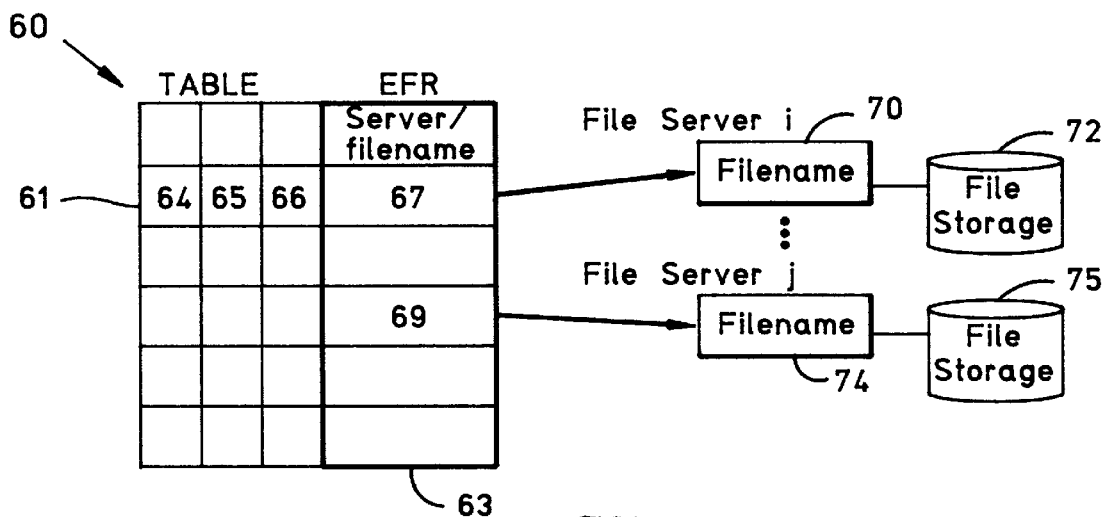
FIG. 3 is a block diagram illustrating specific links between a table in a relational database system and of files in a file system.

Referring now to FIG. 3, a relational database system is based upon the existence of relations that may be illustrated as tables, such as the table 60 in FIG. 3. The table 60 includes a plurality of columns, such as column 63, that essentially define respective fields of table rows, such as the row 61. For example, the four columns of the Table 60 in FIG. 3 establish four fields 64, 65, 66, and 67 of the row 61. In relational database systems, rows are also referred to as "tuples". Table columns, such as column 63, are also referred to as "attributes". Columns may be defined over "data types".

The invention provides for the definition of relations that accommodate existence of an attribute that refers in some way to a file in a file system. For such columns, the invention provides a new data type in the relational database system. This data type is referred to as the "external file reference" (efr) data type. Preferably, the data structure for the efr data type includes the name of a server and the name of a file (filename). Relatedly, assume that column 63 has been defined over the efr data type. Assume further that the field 67 of tuple 61 contains serveri/filename, a reference identifying a file server (server i) that controls a file 70 (filename) in file storage 72. Similarly, the tuple field 69 is an efr data type containing server j/filename, a reference to server j controlling the file 74 stored in the file storage 75.

The novel efr data type provided by this invention supports a database system behavior that causes the DBMS to issue a "LinkFile"("UnlinkFile") command to an appropriate file server for the named file when an enterprise user issues an SQL insert/update (delete/update) call. The procedures that implement the LinkFile command (described in more detail below) apply constraints to the file. Such constraints include, for example, making a database system the owner of the named file and marking the file as read only. The invention provides this linkage in a transactional scope. The rationale for changing the owner of the file to the database system from a file system user is to prevent the file from being renamed or deleted by file system users, which guarantees the integrity of any reference made in the database system to the file. Marking the file as read only guarantees the integrity of indexes that may be created on the file and stored in the database system for search. Thus, the database link embodied in the LinkFile command applies constraints that prevent renaming or deletion of the file by a file system user once the file is referred to in the database system.

With reference to FIGS. 1 and 3, the invention employs an application such as the application 24 and standard interfaces such as an SQL API 27 for database access and the file system API 28 for standard file system calls (such as open, read, close) to access files. An application scenario would unfold as follows. Assume the application 24 issues an SQL SELECT statement to search on the database in the database storage 16. Assume that the database includes the relation 60. In this regard, the query returns its results, which include one or more server/filename references as normal column data in the efr data structure (assuming any efr column is selected in the query). The application 24 can then use the file system API 28 and the file communication path 34, employing standard file system protocols to access the relevant portion of a file.

Note that the invention does not interpose a database system in the file communication path 34, which provides file access. The operation of the invention only interposes in the file system when a file is opened, renamed, or deleted. Significantly, the invention can, therefore, be used with stream servers (such as video servers) and provide the added value of a robust link between such servers and a database system without the database system being in the file access path.

The invention imposes no data model of its own for applications. The data model is whatever can be supported by the relational model (or any other database scheme).

Figure 4:
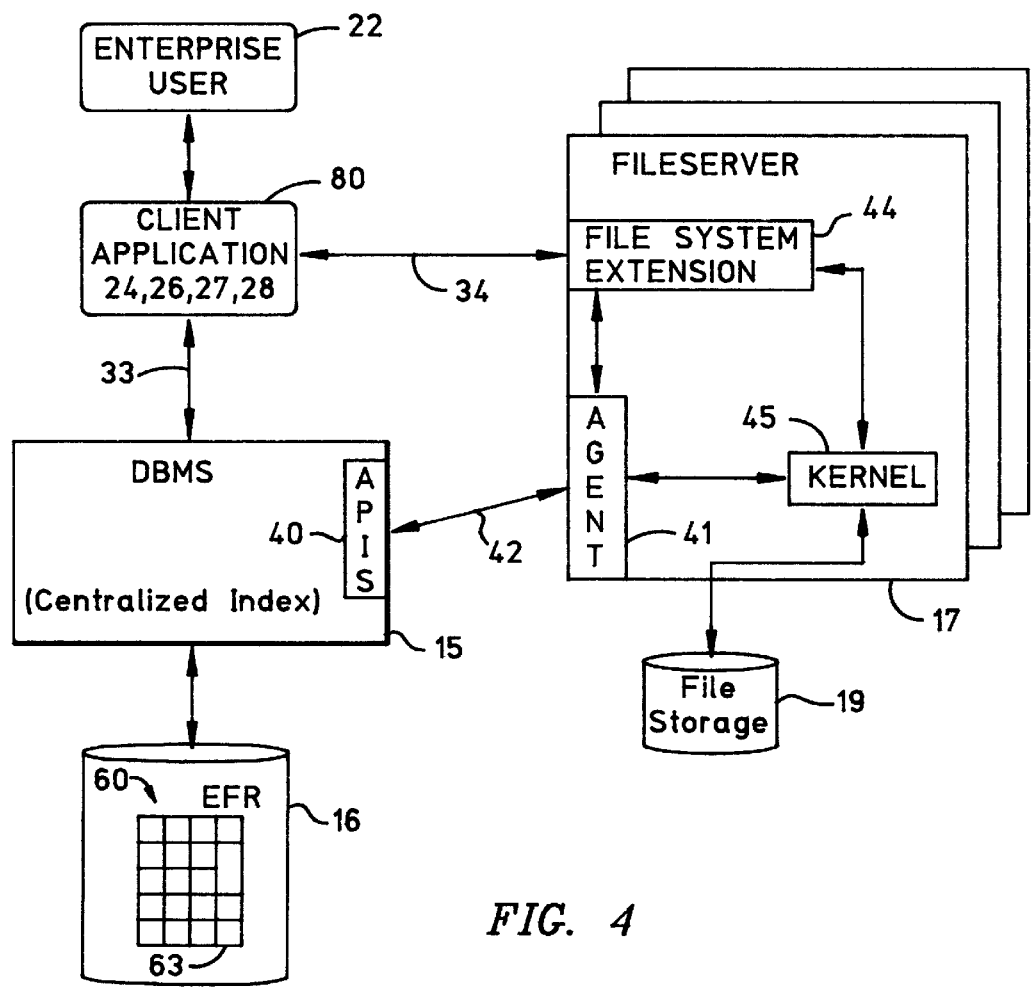
FIG. 4 is a block diagram illustrating the preferred embodiment of the invention.

Referring now to FIGS. 3 and 4, the enterprise configuration implicit in FIG. 3 is possible when objects are stored as files in a file server but are linked to a database system by references in database tuples. In this case, the database system can act as a centralized index for searching across the enterprise-wide data that includes both enterprise data and extracted features of non-coded data, and large objects that can be distributed among several file servers. Such a configuration can save network costs since the large objects can be stored close to end users and, therefore, can be delivered over shorter distances. Note that such a configuration would not be possible if the large objects were stored in the database system.

FIG. 4 illustrates an essential architecture for a combination of the enterprise system illustrated in FIG. 1 and the efr data type that allows the definition of relations such as the relation 60 in FIG. 3. In FIG. 4, a client application 80 includes the application 24, client logic 26, SQL API 27, and file system API 28 of FIG. 1 that represent the enterprise user 22. The client application 80 communicates with the DBMS 15 by the SQL communication path 33 and communicates with the file server 17 by the file communication path 34. The DBMS 15 and file server 17 are coupled by the control communication path 42 over which the APIs 40 communicate with the database agent 41. The database stored at 16 includes one or more relations with efr data types, such as the table 60 of FIG. 3. The essential architecture of FIG. 4 provides a centralized database system with distributed file servers. The invention is implemented in standard API's for database and file system access. The architecture requires no modification of any file manager in any file server.

Figure 5:
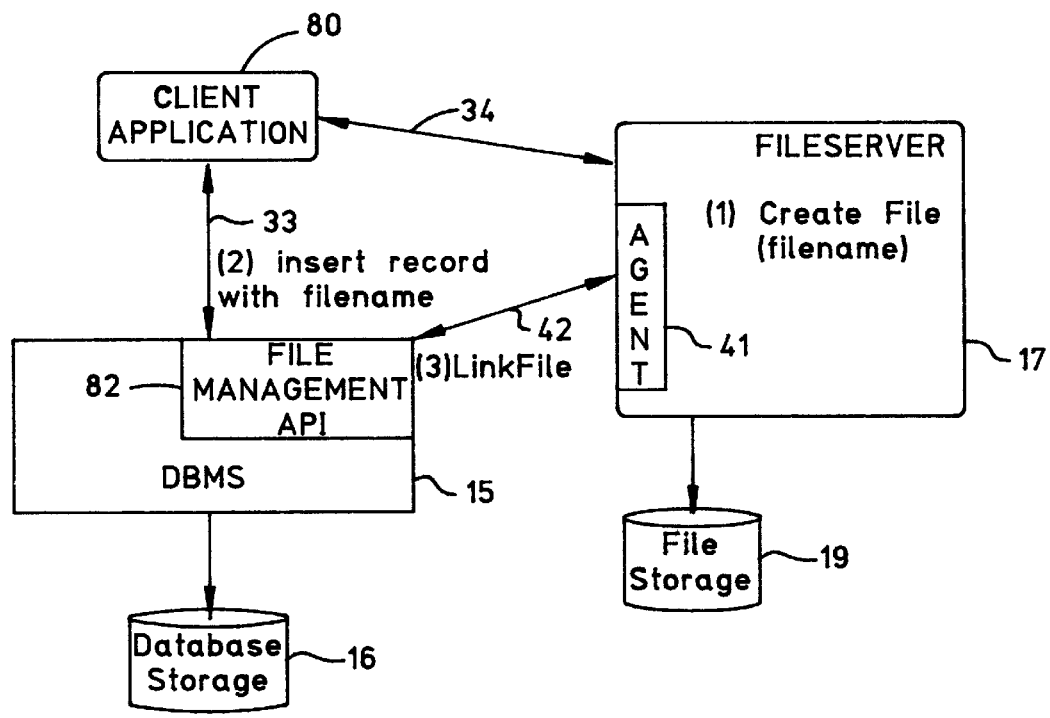
FIG. 5 is a process flow diagram illustrating a database LinkFile operation performed in the architecture of FIG. 4 according to the invention.

FIG. 5 illustrates a three-step LinkFile operation. In step (1) the file with the name filename is created in the file server 17 and passed to the client application 80 over the file communication path 34. In step (2), the client application 80 requests on SQL communication path 33 the insertion of a record with an efr field containing server/filename into the database stored at 16. In response to the request to insert the record, a file management API 82 in the API 40 "links" the file filename by asserting control over the file; this is step (3). Control is asserted by a LinkFile command provided by a file management API 82 (one of the APIs 40) to the database agent 41 on the control communication path 42. The LinkFile command names the file, specifies a type of access control to be applied to the specified file, and conditions a readonly flag contained in the structure of the command to indicate whether or not the file is to be maintained in the readonly state. The database agent 41 recognizes the command and responds to it by denoting the DBMS 15 as the "owner" of the file in the file system, thereby preventing any file system user from renaming or moving the file. The agent 41 appropriately sets a readonly field in a file system directory according to the condition of the corresponding flag in the command. In denoting the DBMS 15 as the owner of the file at the file server 17, the LinkFile command prevents the named file from being renamed, moved, or deleted by any file system user for so long as it is linked to the database system by the reference to filename in the record inserted in step (2). This guarantees referential integrity of the reference in the inserted record.

Figure 6:
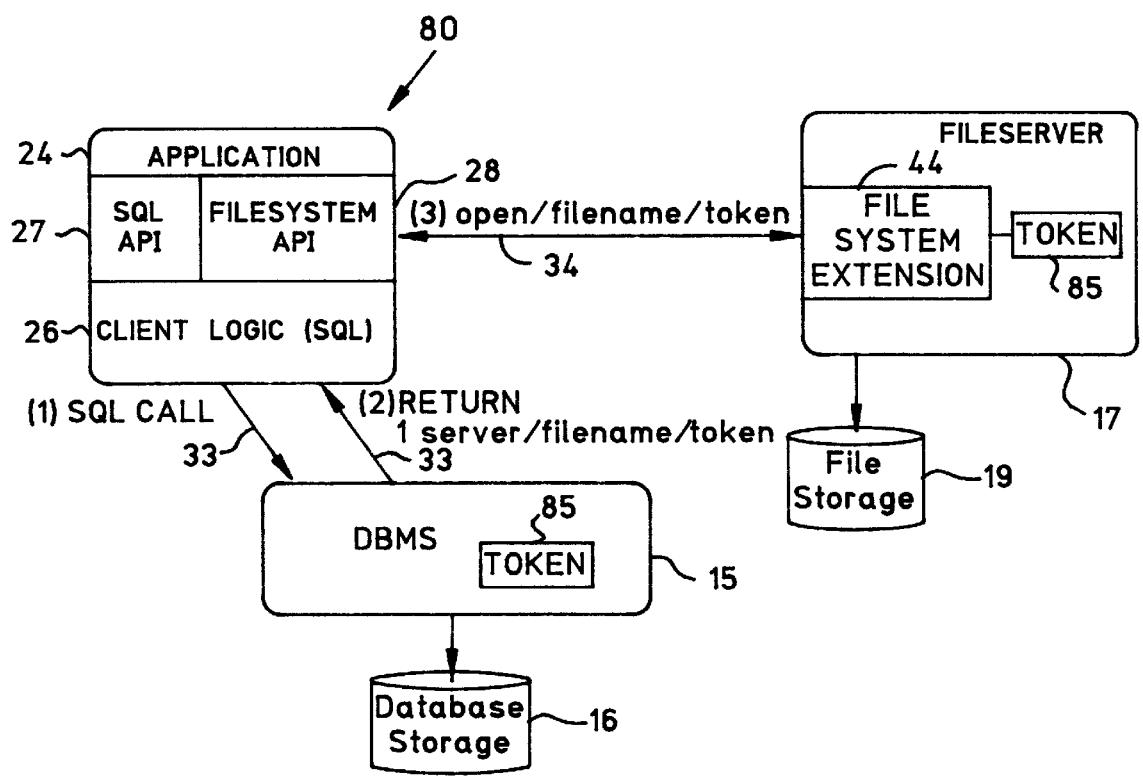
FIG. 6 is a process flow diagram illustrating a read operation performed in the architecture of FIG. 4 according to the invention.

FIG. 6 is a flow diagram illustrating an example of reading a file using the invention. In the description, it is assumed that file system users must be authorized to access a file server. In this regard, each file server maintains an agent, typically a file system extension such as the file system extension 44, to impose security constraints including a check of authority of users to access files. Similarly, the database system includes an authorization manager that imposes security constraints including a check of a user's authority to access the database. The challenge of the architecture illustrated in FIG. 4 is to afford an enterprise user access to the file system in such a manner as not to proliferate authorization procedures for every file server from which the enterprise user seeks a file. The solution provided by the invention is to authorize the DBMS to access files which it has "linked" by way of the LinkFile command as described above. Relatedly, a token 85 (FIG. 6) signifies the DBMS's access authority. The token is generated by the DBMS 15, using the name of the file which is to be accessed. The file system extension 44 possesses a routine to decode the token 85 which was generated by DBMS and validate it. If the token 85 is not provided by the user in the open call, then the file-access-permissions of the file system would decide whether the file is allowed to be accessed or not. If a file's ownership was changed to DBMS, then a normal user cannot access the file without providing the token.

In the three-step procedure for reading files that is illustrated in FIG. 6, it is assumed that an enterprise user represented by the client application 80 is authorized to access the database system. The database request is passed to the DBMS 15 via 24, 27, 26, and is issued by the client logic 26 as an SQL call to read filename in step (1) on the SQL communication path 33. Assuming that the DBMS 15 has linked the file, it searches its relations conventionally, finds the tuple and its efr column with the provides the server name that owns the file filename and returns, in step (2) the data structure server/filename/token, having generated and appended a copy of the token 85 to the returned data structure. The return is made on the SQL communication path 33, received by the client logic 26 and passed to the file system API 28. In step (3), the file system API 28 issues, on the file communication path 34, a request to open filename and appends the copy of the token to the request. The request sent to the file server 17 by the file system API 28 has the form open/filename/token. The file system extension 44 authorizes the operation after validating the token 85 by using filename as one of the arguments for the decoding routine maintained in the file server 17. The file is then streamed to the user through the file system API 28 on the file communication path 34. It should be noted that the invention employs the SQL API 27 for database system access and the file system API 28 for file access and, further, that there is direct data delivery of the file on the file communication path 34 between the client application 80 and the file server 17 with the DBMS 15 entirely out of the data path 17, 34, 28, 24.

Extensions to DBMS for efr Data Type Processing

Figure 7:
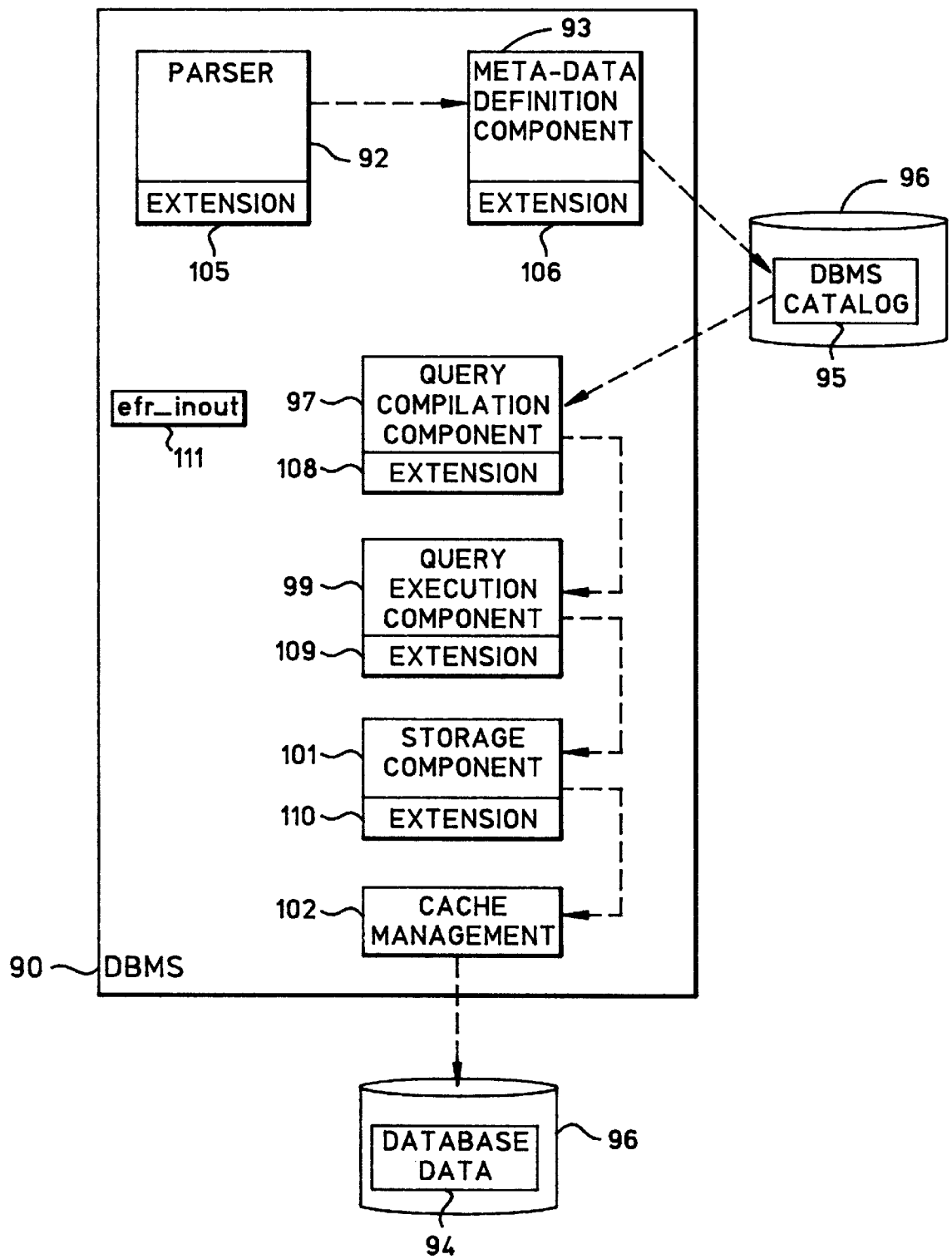
FIG. 7 is a block diagram showing components of a database management system.

Refer to FIG. 7 which illustrates extensions required to practice the invention in a conventional database management system as would be found, for example in a commercially available RDMS. In FIG. 7, the database management system (DBMS), indicated generally by reference numeral 90, includes a query parser 92, a meta-data definition component 93, a DBMS catalog 95, a query compiler 97, a query executor 99, a storage component 101, and cache management 102. Database data 94 and the DBMS catalog 95 are stored on a conventional direct access storage device, such as a disk 96. The dotted lines indicate interaction between the components of the DBMS 90. These components are conventional in all respects save extensions 105, 106, 108, 109, and 110. Relatedly, the query parser 92 parses and translates SQL statements into low-level procedures. In this regard, when a user defines a column in a query language, such as SQL, the query parser translates the column into one or more low-level procedures that implement the column. It is assumed that a user can define a column of type efr in the query language and the extension 105 enables the query parser 92 to accept efr as a valid token or element in the column definition.

The meta-data definition component 93 tracks relational tables, column definitions, and their data-types in the DBMS catalog 95. The extension 106 enables the meta-data definition component 93 to validate the efr data-type for columns which are defined as such when a table is defined. The extension 106 also enables the meta-data definition component 93 to define a group when an efr column is defined in a table. When the table is dropped, the group is undefined.

The query compiler 97 accepts SQL query statements such as INSERT, DELETE, UPDATE, and SELECT from an application program, recognizing the columns and their data types involved in the input or the output of the query by looking them up in the DBMS catalog 95, recognizing predicates specified on certain columns (if any) and compiling the query for efficient processing by the DBMS 90. Configurable parameters for these statements, such as the name of a file, file type, file location, and the number of file copies are provided by the client application to the DBMS in a data structure efr_inout 111. The query compiler 97 also calculates memory which should be reserved for query execution based on columns involved. By virtue of the extension 108, the query compiler 97 looks to the DBMS catalog 95 to determine whether a column is of an efr type. For an efr column, query compiler 97 estimates memory in terms of the size of the file name, which is a contained in efr_inout 111.

The query executor 99 is responsible for allocating memory in the DBMS address space for a query as determined by the query compiler 97, moving from (or to) data values for each column based on an SQL query such as INSERT (or SELECT), performing any data conversions for compatible data types, and invoking storage component 101 of the DBMS 90. The extension 109 enables the query executor 99 to describe expected input and output data values for an efr column in the efr_inout data structure.

The query executor 99 provides (or receives) the data values of each column to (from) the storage component 101 for INSERT/UPDATE (or SELECT) calls. For a DELETE call, the query executor 99 simply issues a delete-record call to the storage component 101. For an INSERT call, the storage component 101 is responsible for formatting the database record which is to be persistently stored in the database, updating indexes which are defined on specific columns, and logging the database record. In case of transaction abort or DBMS crash, transaction management (not shown) invokes the storage component 101 to process the log-record which it created.

For an efr column, a user can provide values in the efr_inout data structure or specify NULL. The NULL value for the value is tracked just as any nullable column for other data types. The non-NULL value provided by efr_inout is transformed to the storage format. For example, a server-name is transformed into server-id after looking up a file server configuration file defined in the DBMS 90. A generation-id is provided by the database agent 41 when a file with this filename is linked. If the filename does not exist in the identified file server, the INSERT call is failed with an appropriate return code. Furthermore, the log-record for the link file operation may be written. This is so that in case of undo processing of the SQL statement, the storage component 101 can inform the database agent 41 to perform an undo procedure by an unlink-file operation.

For a SELECT call, the storage component 101 retrieves the database record from the database efficiently based on query compilation. Values of different columns which are requested in the query are returned to the query executor 99.

For an UPDATE call, processing is similar to the INSERT call, except that the database record is first retrieved, and then formatted with the values of the unmodified columns and the values of the columns which are to be modified provided in the UPDATE call.

With respect to the extension 110 of the storage component 101, when an efr column is updated, it is assumed the application provides either of two values: NULL or server/filename. When the value is set to NULL, the storage component 101 issues the unlink-file command to the database agent 41 for the file which is referenced in the efr field of the record. Otherwise, server/filename is provided in the efr_inout data structure. Relatedly, if the stored value is NULL, then the record is updated to mark the value as not-NULL with the processing as described for the INSERT call. If the server-id of the input value is the same as the one in the stored column, but the filename is different, then the storage component 101 issues an unlink-file command for the filename referred by the stored column, and a link-file command for the filename provided in the efr_inout. If the server-id of the input value is different than the one stored in the stored column, then the storage component 101 contacts the file server referred by the stored column and issues an unlink-command to that file server for the file name currently stored. The storage component 101 then contacts the file server referred to by the efr_inout and issues a link-file command for the filename provided by it.

For the DELETE call, processing by the storage component 101 requires marking the space for the record free after retrieving the page containing the record, updating the indexes on the specified columns, and writing the log-record. Then, when an efr column is defined, the storage component 101 extracts information such as the server-id and filename from the stored column, contacts the database agent in the named file server and issues an unlink-command for the named file. Furthermore, the log-record for the UnlinkFile operation may be written so that if undo processing of the SQL statement is required, the storage component 101 can inform the database agent to do its undo, that is relink the filename.

Refer now to FIGS. 1, 4, and 7 and to Application Programming Interface (API) Tables 1–8 where an understanding of specific operations of the DBMS 15 according to the invention. API Tables describe the APIs 40 that are executed during these operations. Those skilled in the art will recognize that each API description illustrates a preferred embodiment and best mode design definition for a C language software procedure or computer program which may be compiled and executed on a digital computer.

In the invention, the DBMS 15 interacts with a database agent, such as the database agent 41, when processing database data structures containing references to files in a file system wherein the database agent resides. In the context of an RDMS that uses a relational database language such as SQL, there is a possibility that one or more of at least five file-referencing processing operations would occur. These operations include creation of a table, insertion of a record, reading of a record, deleting or updating of a record, and dropping a table.

When a table is created in an RDMS, the invention is practiced in a DBMS such as the DBMS 15 by definition of a group that is assigned a file group name. A file group management API (one of the APIs 40), such as is illustrated in API Table 4, participates in table creation by issuing a DefineGroup command having the syntax illustrated in API Table 4. In the context of FIG. 1, this command is provided on the control communication path 42 to the database agent 41. The file group management API of API Table 4 thus provides control information in the form of a group name that is used to control processing at the file system or file server of any file or files that are included in a group files identified by the group name.

When a record having a reference to a file in a file system is inserted into a database table that includes a column defined over an efr data type, a file management API illustrated in API Table 6 operates to place the file under the control of the database agent in the file server where the file is located. In response to insertion of such a record, control information is provided on the communication path 42 to the database agent 41 and a LinkFile command that is illustrated and described in the description of the file management API in API Table 6 is issued. The LinkFile command that is issued identifies the file group under which the file is to be linked and specifies access control to be applied to the file. The control (described above) is implemented by the database agent 41 and includes marking the DBMS 15 as the owner of the file which prevents any file system user from renaming or moving the file. In the LinkFile command illustrated and described in API Table 6, a readOnly flag is included in the command. Preferably, this flag is conditioned to inform the database agent 41 whether or not to maintain the identified file as a "readOnly" file, thereby further controlling processing of the file at the file system. Importantly, as API Table 6 illustrates and describes, the LinkFile command can be used to control processing of one file or more than one file in the file system.

When a database record having efr field with a value that contains a reference to a file in file system is deleted from a table or updated, the file management API returns control of the file to the file system by means of the UnlinkFile command that is illustrated and described in API Table 6. Importantly, the UnlinkFile command either returns control of the file to the file system or initiates file system processing to delete the file from the file system.

When a table including one or more columns defined over the efr data type is dropped from the database system, the file group management API in the DBMS issues a DeleteGroup command by which the file system where the files are located is enabled either to reacquire control of the file or files in the group or to delete the file or files altogether.

The following are examples of these DBMS operations in the context of commands that are specific to the well-known structured query language ("SQL"). While SQL is a specific instantiation of a database language, the inventors do not intend to limit this invention to being implemented only in SQL. Those skilled in the art will realize that the teachings in this entire document are broadly applicable to other database languages. For an understanding of SQL, reference is made to J. R. Groff, et al., *LAN Times Guide to SQL*, (1994), and to the Date reference previously cited.

Examples of efr Data-Type Processing

DEFINING EFR COLUMN IN A TABLE

In the example, assume an SQL CREATE statement is used to create a table with an efr column. For example, assume c3 is defined as an efr column.

CREATE TABLE t1 (
  c1 integer,
  c2 char(40),
  c3 efr
)

The processing specific to the efr column is as follows:

1. The query parser 92 recognizes that c3 is an efr column; and
2. metadata-definition component 93 marks c3 as an efr column in the RDBMS catalog 95. It also defines a group with name t1.c3 in the database agent 41 using DefineGroup. The group is defined in the transactional scope by starting BeginTxn if one is not already started.

INSERTING A DATA-RECORD IN TABLE T1

In the example, assume an SQL INSERT statement is used to insert a record with an efr field into the table created in the previous example. In this regard, values for the efr column are set as follows via efr_inout data structure.

efr_inout.servername='server1'
efr_inout.file_prefix_len=8
efr_inout.file_stem_name=11

INSERT INTO TABLE t1
  (c1, c2, c3) VALUES
  (5, 'John Doe', efr_inout)

The processing specific to the efr column is as follows:

1. The query compilation component 97 looks up the RDBMS catalog 95 for the datatype of each column. It prepares the query for execution by marking the datatype of each column and estimating space for datavalues. In the case of an efr column the space is estimated as the size of efr_inout and maximum allowable size of the filename. (The max size of filename is a configurable parameter for a DBMS);

2. The query execution component 99 allocates the memory estimated by the query compilation component 97. It copies the values of the efr_inout and the filename specified by the application to the RDBMS address space. It sets up parameters for each column (datatype, length, non-null indicator, data-values) to be processed by the storage component 101. For the efr column, the data-values are efr_inout plus the filename; and 3. For the efr column, the storage component 101 examines the efr_inout to determine the server-name, start the BeginTxn if one is not already started with that server writes the log record for the LinkFile operation, issue LinkFile providing it the filename, group-name (and other parameters). If the file does not exist, database agent 41 would tell it via return code and the INSERT call is failed. Otherwise, the storage component 101 continues its processing to format the efr-column in memory to the stored format. The stored format is as follows: length of the fixed-part of the column-data plus the filename, fixed part of the column-data, and the filename. From hereon, normal RDBMS processing would cause the data record to be stored in a page and make it persistent.

READING A DATA-RECORD IN TABLE T1

In this example, assume an SQL SELECT statement is used to read an efr field in a record.

SELECT c3 FROM t1
WHERE (c1=5)

The processing specific to the efr field is as follows:

1. The query compilation component 97 determines the access path by which to access the record with predicate of (c1=5);

2. The query execution component 99 orchestrates access to the record with (c1=5). It invokes the storage component 101 to access the record;

3. The storage component 101 sets up the following parameters for each column (datatype, length, null or not null, address of datavalue). For the efr column which is non-NULL, this implies (efr, length=(fixed-part of the column+the filename), non-null, data-value=(address of the efr column in the data-record); and 4. The query execution component 99 then transforms from the stored column format to the efr_inout data structure, if the stored value is not NULL. It then assigns an access-token for the filename as per using the agreed upon function to use between the file system extension 44 and the DBMS. The efr_inout and the filename+access-token is then copied to the memory location specified by the application program.

UPDATING A DATA-RECORD IN TABLE T1

In this example, assume an SQL UPDATE statement is used to change the contents of the table.

UPDATE TABLE t1
SET c3=NULL
WHERE (c1=5)

The processing specific to the efr column is as follows:

1. The query compilation component 97 operates in the same manner as for the INSERT statement except that it determines the access path by which to access the record with predicate of (c1=5);

2. The query execution component 99 orchestrates access to the record with (c1=5). After this record is brought in memory, the query execution 99 sets up parameters for the efr-column as (efr, length=0, null indicator, data-values=zero); it then invokes the storage component 101 passing the address of the old record and values for the columns provided in the UPDATE call (in this case the efr column); and 3. For the efr column, the storage component 101 notes that the new value is NULL. Therefore, it determines the old server and filename from the old record. It then contacts the database agent 41 in that server, and issues UnLinkfile, providing it the filename, group-name (and other parameters).

DROP TABLE T1

In this example, assume an SQL DROP statement is used to delete the table from the database.

DROP TABLE t1

In the processing specific to the efr column, the metadata-definition component recognizes by looking up the RDBMS catalog that c3 is an efr column defined in table t1. It then issues UndefineGroup t1.c3 to the database agent 41. The database agent 41 unlinks all files in group t1.c3. Again, this happens transactionally.

Referring to FIGS. 1 and 4 and to API Tables 1 and 2, the control communication path 42 between the DBMS, APIs 40 and the database agent 41 is established according to a connection management API that is included in the APIs 40 and illustrated and described in API Table 2. The connection management API creates the control communication path 42 between the database system 12 and the file system 14 that supports exchange of information between the database system 12 and the file system 14. The Connect command establishes a session with the database agent on behalf of a named database. Relatedly, the path is described in API Tables 1 and 2 as a "connection", implying a network-supported communication between the database system 12, the file system 14, and the enterprise user's client application 80. This is not intended to limit the invention to being implemented strictly in a network, but merely to provide an example of a path between the database system 12 and the file system 14. In the connection management API of API Table 2 there is illustrated and described a QueryLimits command that obtains limits for various parameters necessary for the connection as determined by a file manager in the file system with which the database system is communicating. This command is issued by the database agent 41 and provided to the connection management API to parameterize the communication path 42. In the form of a connection, the link is disestablished by the Disconnect command illustrated and described in API Table 2.

In the Read example described above, a "token" is set forth. In API Tables 1 and 2, the token is referred to as an "authorization identifier". The authorization identifier is generated in the DBMS according to an encoding or encryption procedure known to the file system extension 44. The file system extension 44 validates the token by decoding or decrypting the filename in the inverse of the procedure used by the DBMS for encoding or encryption. The inventors contemplate the use of a known file naming convention in which a portion of the name can either be invariant or change over time with the change in the name of the file system. In this latter regard, the file name prefix management API illustrated and described in API Table 5 would provide a DBMS with the means for correctly identifying a file system whose name would change with, for example, a change in its mount point over time. Relatedly, with reference to the description of the file name prefix management API, the inventors contemplate that the file name embodies two parts, prefix-name, and stem-name. The stem-name is considered to be time-invariant. However, the prefix-name can be changed by administrative commands of a database agent such as the database agent 41. When changing the prefix name, the database agent would assign a time-invariant prefix-id for prefix-name even though the prefix-name may change. In this case, the DBMS 15 stores the prefix-id and the stem-name in the efr-column of the database record when, for example, an INSERT call is issued. To support retrieval of the complete file name as a result of, for example, a SELECT call referencing an efr column, the DBMS must map a prefix-id to a prefix-name, for which purpose the file name prefix management API (one of the APIs 40) is provided. Preferably, the DBMS would build a cache of such mappings to reduce the message exchanges with the database agent. Such a cache is indicated in FIG. 1 by reference numeral 120.

In API Table 3, a transaction management API is illustrated and described. If the DBMS 15 is a transaction-based system, the transaction management API provides a transactional basis for conducting procedures and operations of the invention. Relatedly, a data recovery API is also illustrated and described in API Table 7 for recovery of information maintained by a database agent when a database system having references to files in a file system where the database agent is located crashes. The APIs 40 of the database management system 15 also include a reconciliation API illustrated in API Table 8.0 that reconciles database records with file system information in the event of interruption in the operation of a file system containing files referenced in the database system.

File System Architecture

The invention is intended for use with a filing system that is external to a database system. With reference to FIG. 1, the file system 14 is exemplary. Relatedly, although the file system architecture shown in FIG. 1 includes a file server 17 that executes a computer program embodying the file manager 18, this architecture only represents a preferred embodiment; in fact, the invention is intended to be used with other instantiations of generalized filing system architecture. Nevertheless, with reference to the preferred embodiment of the file system 14 that is illustrated in FIG. 1 and with further reference to FIG. 8, certain aspects of the architecture of the file system 14 will now be discussed.

The file manager 18 preferably embodies a computer program of the UNIX-type, of which the IBM AIX product is an example. In such a computer program, a file manager such as file manager 18 is commonly embodied in a computer program that include a kernel such as the kernel 45. The file system extension 44 may be an extension of the kernel 45 and is allocated a set of functions that ensure authorized access to files of the file system. Among these functions are validating authorization of access to files in the file system. The file system extension's operations are invoked by the kernel 45 when the kernel receives requests to OPEN, RENAME, and DELETE files (among other requests). The kernel 45 receives such requests from file system users, from enterprise users, and from the database agent 41 (in, for example, the DeleteGroup and UnlinkFile commands). For an open/filename/token request from an enterprise user, the kernel 45 invokes the file system extension 44 to validate the unique token for file access by the enterprise user. For RENAME and DELETE requests from file system users and for DELETE requests received via database agent 41, the kernel 45 invokes the file system extension 44 with the request that the file system extension 44 check with the database agent 41 whether the file is linked or not. In this regard, the database agent 41 maintains its own persistent data structures such as the data structure 46 for tracking control information provided on a control link with a DBMS. Such control information includes, for example, group names, file names, access control, read-only, and recovery id information. Thus the database agent 41 informs the file system extension 44 as to control information, if any, asserted by a DBMS with respect to a file name found in the persistent data structure 46. If the database agent 41 informs the file system extension 44 that a file name is in the persistent data structure 46, the file system extension 44 rejects RENAME or DELETE requests directed to the named file from a file system user. If the DELETE request comes from the database agent 41, the file system extension 44 authorizes the requested operation. In this manner, a file system controls processing of files which have been adopted by a database system according to referential integrity constraints that include, without limitation, inhibition of RENAME and DELETE requests from file system users, read-only processing, if requested by the DBMS, and any other access control constraints communicated to the file system from the database system.

Figure 8:
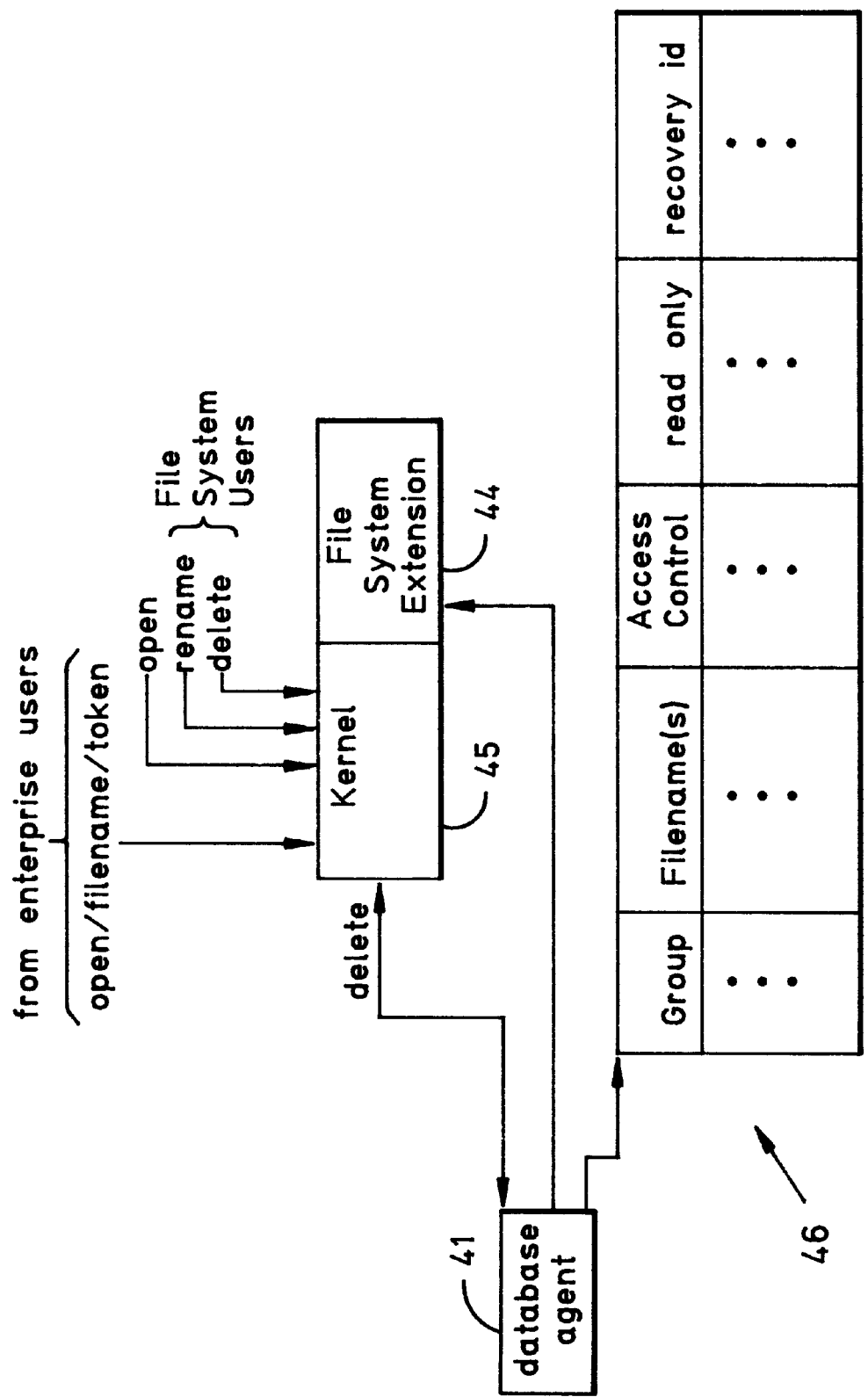
FIG. 8 is a block diagram showing architecture of a file server.
Figures 9, 10:
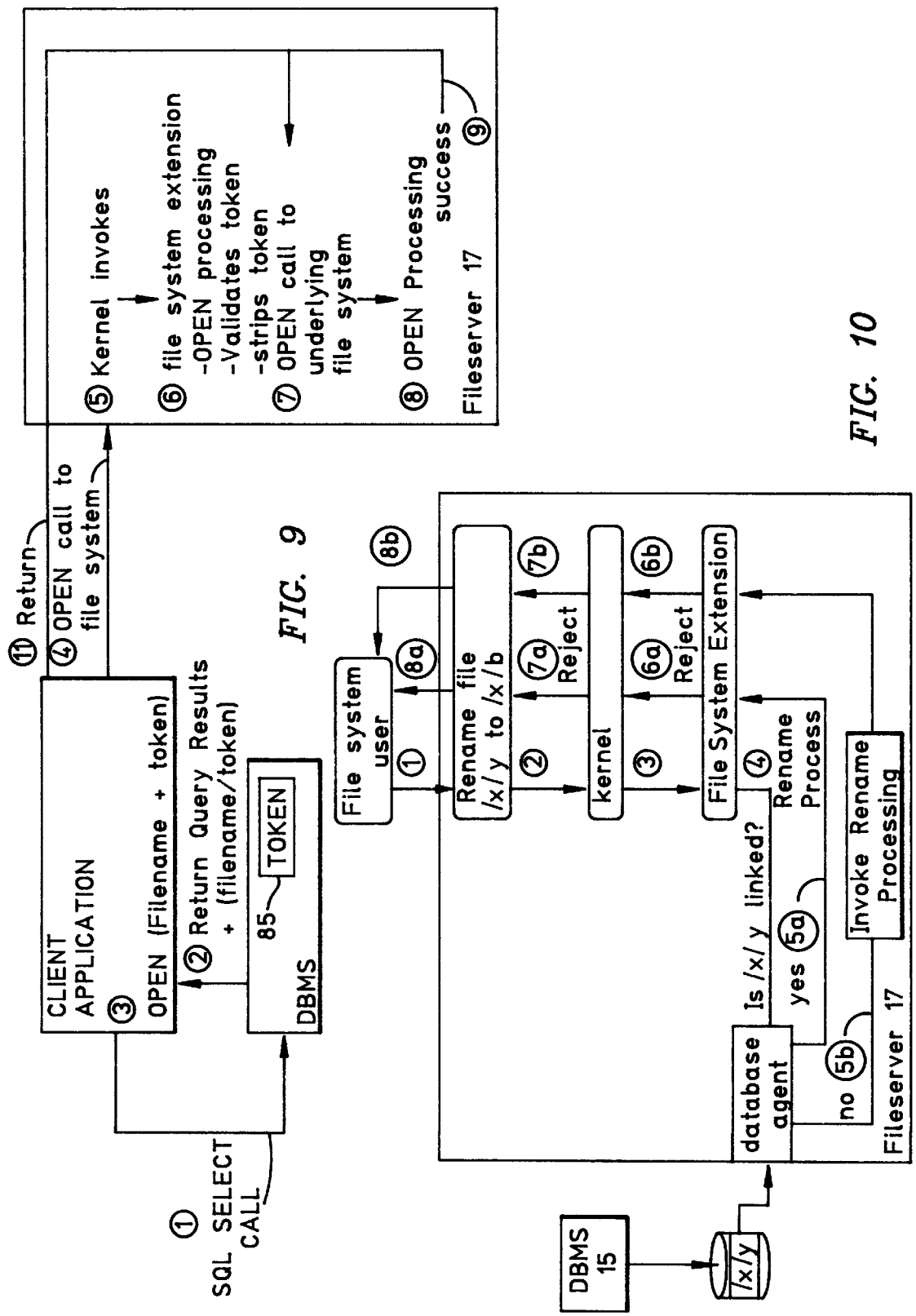
FIG. 9 is a process flow diagram illustrating the OPEN operation of FIG. 6 in greater detail.
FIG. 10 is a process flow diagram illustrating how referential integrity of a database system is maintained according to the invention.

With the preceding description of file system preferred embodiment, especially with reference to FIGS. 1 and 8, a more detailed description will now be given of processing according to the invention in response to an enterprise user's request directed to a DBMS for a file in a file system which the DBMS has linked. This processing is illustrated in FIG. 9; for consistency, FIG. 9 refers to DBMS 15, client application 80, file server 17 as shown in FIG. 6. In FIG. 9, the client application 80 forwards an enterprise user's request for the file named filename in the form of, for example, an SQL SELECT call in Step 1. The DBMS 15 using the SQL processing with extensions explained above generates the token 85, performs the query and returns the results together with the file name and token in Step 2. In Step 3, the file system API of the client application 80 issues a file system OPEN call in the form of open/filename/token to the file server 17 in Step 4. In Step 5, in response to OPEN call, the kernel 45 invokes the file system extension 44. In Step 6, the file system extension 44 begins OPEN processing, by validating the token and stripping it from the file name. The file system extension 44 then passes the OPEN call to the underlying file system in Step 7. In Step 8, the underlying file system conducts conventional OPEN processing, returning, in Step 9, to the file system extension 44. The file system extension 44 passes the results of the OPEN call back to the kernel 45 in Step 10. Kernel 45 in Step 11 passes the results of the OPEN call back to the client application 80.

FIG. 10 illustrates in detail the processing in the file server 17 in response to a RENAME or DELETE call, and shows how the processing of the file server 17 is controlled by control information received from the DBMS according to the invention. Assume that the DBMS has linked the file name /x/y that is controlled by the file server 17. Assume that a file system user in Step 1 requests that the file server 17 rename the file from /x/y to /x/b. The RENAME request is received in Step 2 by the kernel 45. In Step 3, the kernel 45 invokes and passes the RENAME request to the file system extension 44. In step 4, the file system extension 44 passes the request to the database agent 41 that asks whether the file /x/y has been adopted by the DBMS 15. In the example, the file has been adopted and this is indicated in Step 5(a) by the database agent 41 in a return to the file system extension 44. In this case, the file system extension 44 rejects the RENAME request in a return to the kernel's invocation, which is Step 6(a). The kernel 45 rejects the request in Step 7(a), passing the rejection to the file system user in Step 8(a).

Assume, now, that the file /x/y has not been adopted by the DBMS 15. In this case, the database agent 41 in Step 5(b) would answer no to the Step 4 request of the file system extension 44. The file system extension 44 would then invoke the RENAME processing of the underlying file system, the file system would conduct a RENAME processing returning the results to the kernel 45 in Step 6(b). The kernel would, in Steps 7(b) and 8(b) return confirmation of the RENAME to the file system user.

Figure 11:
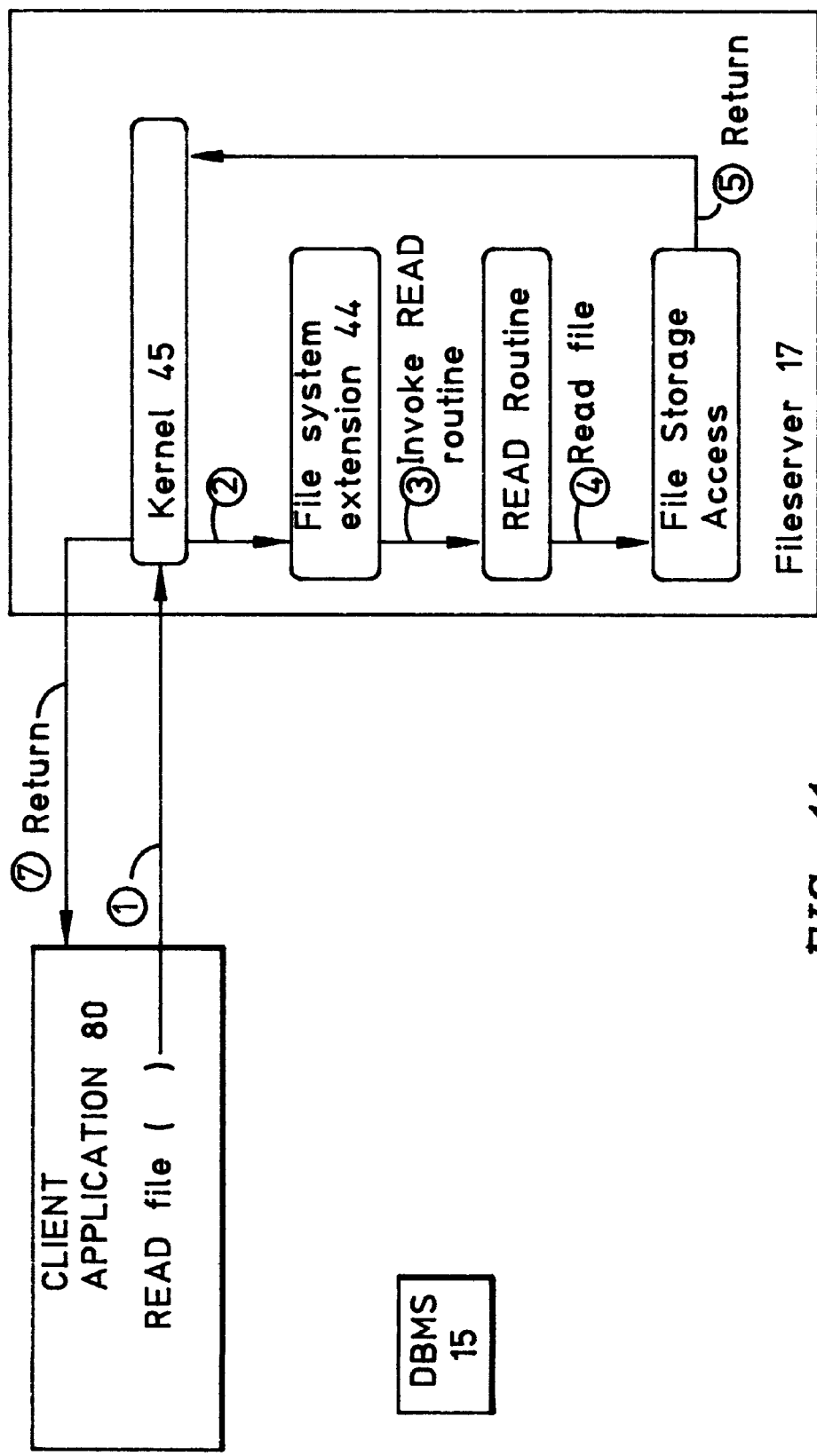
FIG. 11 is a process flow diagram illustrating a READ operation according to the invention.

The inventors contemplate that an enterprise user may act also as the file system user through the file system APIs in the client application 80. Thus, in FIG. 11, client application 80 issues a READ request initiated by an enterprise user. As FIG. 11 shows, the READ request is conventionally processed by the file server 17, returning results directly to the client application 80, bypassing DBMS 15 altogether. FIG. 11 further illustrates that conventional READ requests from an enterprise user are simply passed through the file system extension 44.

Figure 12:
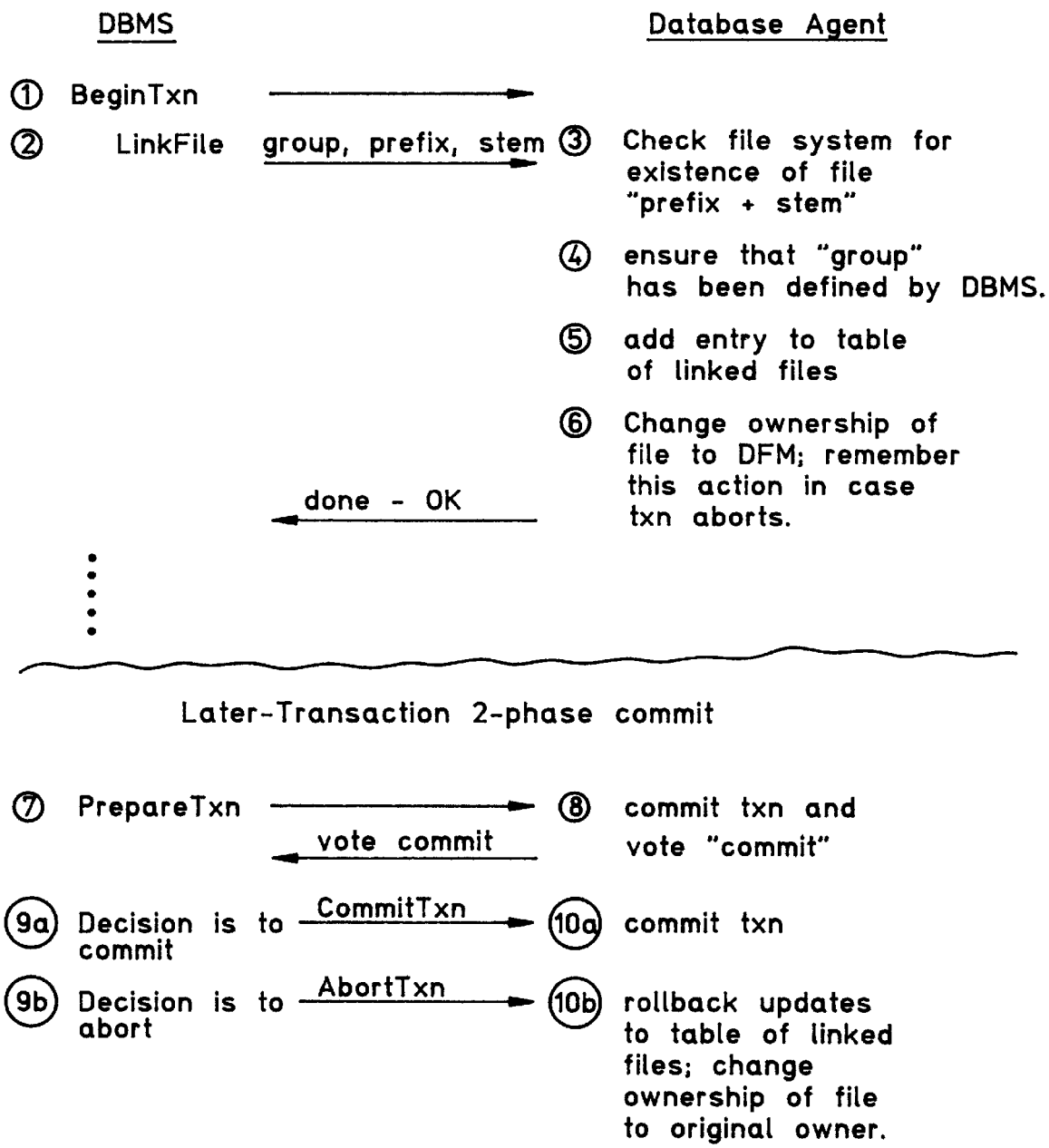
FIG. 12 is a process flow diagram illustrating a transactional context for the invention.

With reference now to FIG. 12 and to the transaction management API illustrated and described in API Table 3, LinkFile command processing in a transactional context will be explained. In this regard, prior to issuing a LinkFile command to the database agent 41, the DBMS 15 issues a BeginTxn command to the database agent 41. The database agent 41 undertakes conventional Begin transaction processing. The DBMS 15 then issues the LinkFile command including one or more references to files in the file system where the database agent 41 operates. In Step 3, the database agent 41 checks for the existence of the named file in the file system, in Step 4 ensures that the named group has previously been defined by the DBMS 15, in Step 5, adds the file name and associated file system processing control information into its persistent data, and invokes conventional file system processing to change ownership of the file to itself in Step 6. Steps 3–6 presume underlying processing to detect success or failure of the described operations. Further, during processing of Step 6, the database agent 41 logs actions taken in Steps 3–6 in case the transaction aborts. Following Step 6, the database agent 41 makes a conventional return to DBMS 15. Following the return, the DBMS 15 in Step 7 issues a PrepareTxn command, which is illustrated in and described in API Table 3. In Step 8, the database agent 41 prepares to participate in conventional two-phase COMMIT processing, evaluates its transaction operations for commitment or rollback and votes accordingly in a return to the DBMS 15. Assuming that the DBMS decides to commit the transaction, the CommitTxn command illustrated and described in API Table 3 is issued by the DBMS 15 to the database agent 41 in Step 9(a). In Step 10(a), the database agent 41 undertakes conventional commit processing to commit operations it has conducted during the transaction begun in Step 1. Assuming that the DBMS 15 decides to abort the transaction in Step 9(b), it issues an AbortTxn command to the database agent 41. In Step 10(b), the database agent 41 conducts conventional transaction rollback processing to rollback all operations bracketed in the transaction started in Step 1. It will be manifest to the reasonably skilled practitioner that the other file group and file management commands illustrated and described in API Tables may also be conducted in a transactional context.

Figure 13:
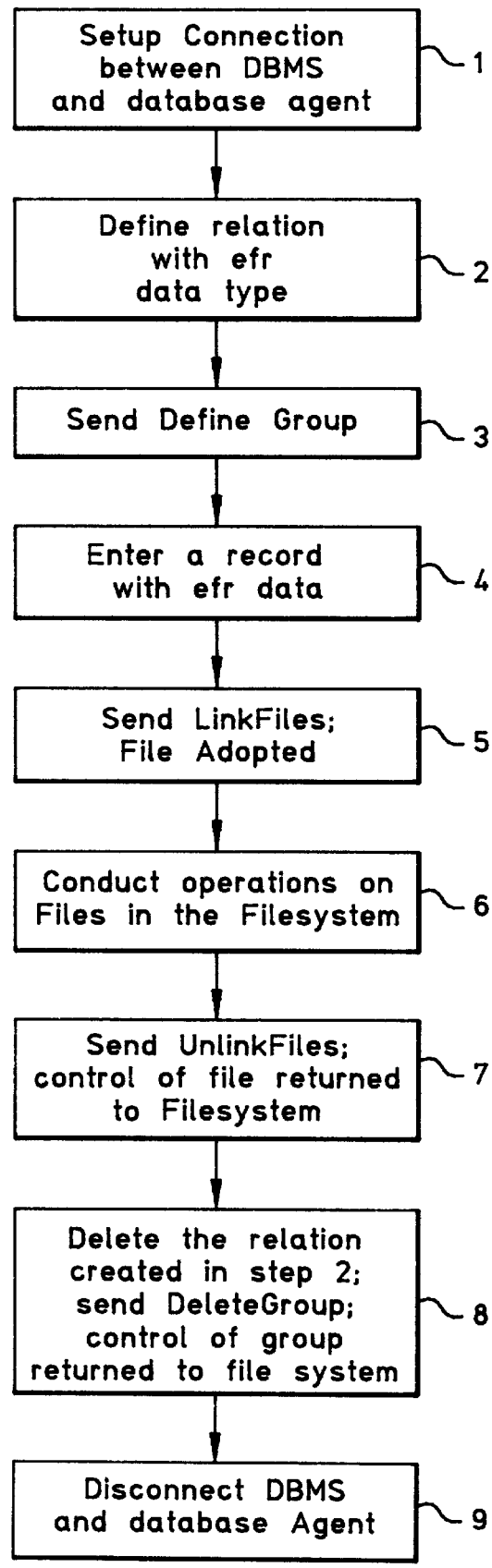
FIG. 13 is a process flow diagram illustrating an overall method according to this invention.

Now, with reference to FIGS. 1 and 13, the overall processing according to the invention will be explained. Initially, the database system 12 is presumed to be connected to a communications interface such as a network that provides communications with the file system 14. In Step 1, the database system 12 creates a connection with the file system 14, using the Connect command, and the connection is parameterized with the Query limits command. A relation with one or more efr data types is defined in the database system 12 in Step 2. In Step 3, the Define Group command is issued to the database agent 41. A tuple with a reference to a file in the file system 14 is entered into the relation in Step 4. In Step 5, a LinkFile command is issued to the database agent 41, causing the database agent to name the DBMS 15 as the owner of the named file in the file system 14. This control information causes the file system 14 to control processing according to the referential integrity constraints implicit in ownership of the file by the DBMS 15 (which include prevention of any file system user from deletion, renaming the file) and any other constraints explicitly included in the LinkFile command. Other processing according to the OPEN and READ examples given above may be conducted in Step 6. In Step 7, the file filename is unlinked by an UnlinkFile command, returning control by the file to the file system, or deleting the file altogether. In Step 8, the relation defined in Step 2 is deleted, causing the DBMS 15 to issue a Delete Group command. In Step 8, the database agent 41 deletes the group named in Step 2, returning ownership of the files of the group to the file system 14, or deleting them altogether. In Step 9, the Disconnect command is issued, disestablishing the connection and breaking the link 41.

Figure 14:
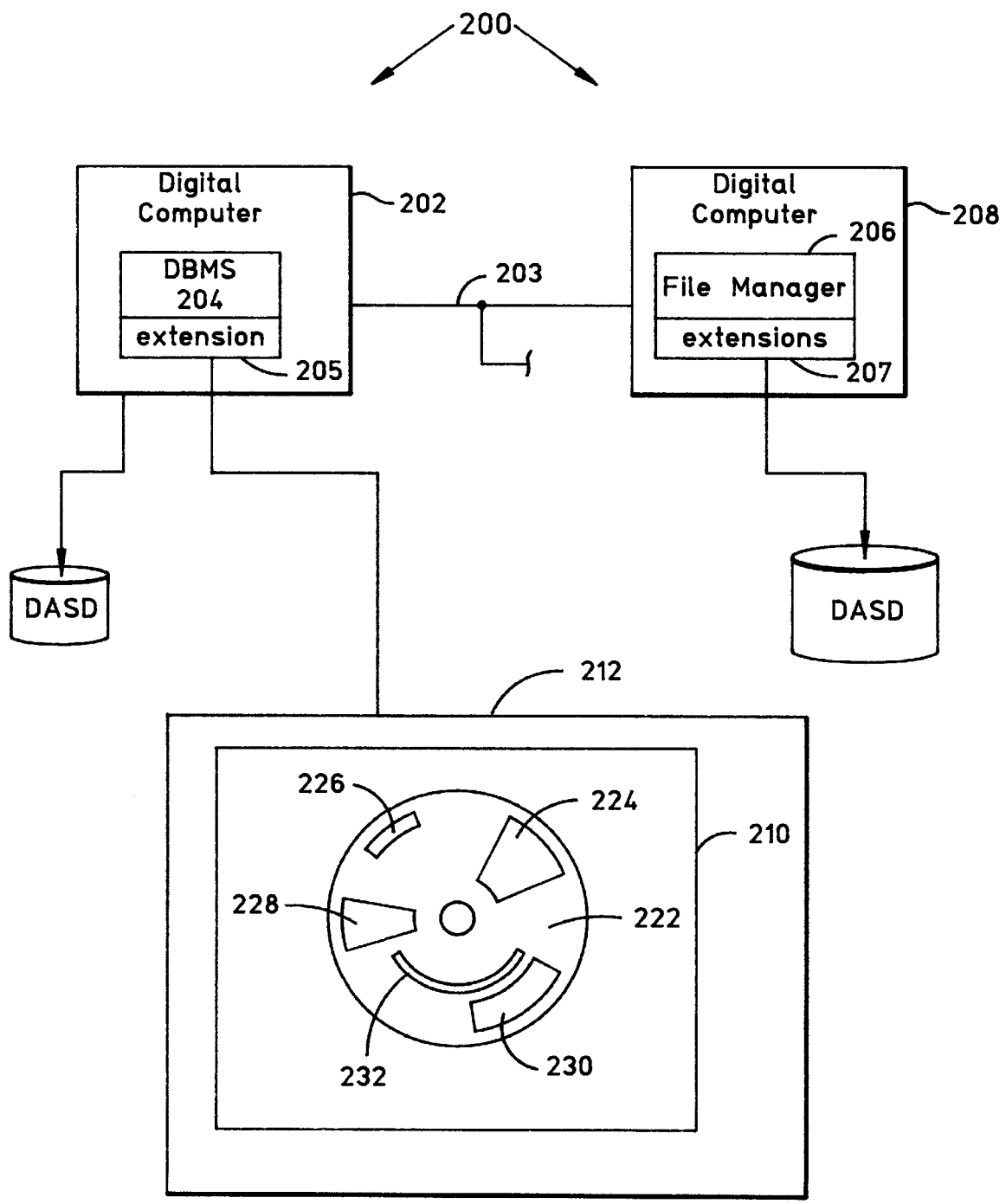
FIG. 14 is a block diagram illustrating a computer system with a computer program product in which the invention is embodied.

FIG. 14 illustrates a digital computer system 200 that can be programmed or otherwise designed to facilitate practice by the invention. As an example, the database system 12 of FIG. 1 can be implemented in a digital computer 202 of the RS-6000 type on which a DBMS 204 (such as the DB2 product available from the assignee of this application) may be installed. Alternatively, the database system may include the DB2 product executing on a System 390 mainframe computer. The file system 14 may include a file system 206, such as an AIX file system, executing on a digital computer 208 of the RS-6000 type. A communications facility 203, which may be a multinode network, couples the computers 202 and 208. The inventors point out that, while the digital computers shown in FIG. 14 are separate, the initial reduction to practice of this invention was made using a single digital computer of the RS-6000 type on which the database and file systems were separately executed using the multi-processing capability of the machine.

The invention is embodied in extensions 205, 207 to the DBMS 15 and file manager 18 that may be embodied in an article of manufacture such as one or more pre-recorded data storage devices including the device 210. The pre-recorded data storage devices may include, for example, magnetically recorded disks or tapes, or optically recorded CD-ROMS. The APIs 40, which are described in detail in API Table 8 and illustrated herein may be rendered as one or more computer software programs recorded on the pre-recorded data storage devices and integrated or linked with the DBMS 15 by conventional means including the storage drive 212.

Relatedly, the storage device 210 includes recording medium 222 on which is recorded program portions 224, 226, 228, 230, and 232, each for directing a digital computer, such as the digital computers 202 and 208 to facilitate the practice of some portion of the procedures of this invention. Even where no single program portion 224–232 includes the entire group of procedures described above, the portions may comprise all program means necessary to direct a digital computer to operate according to the invention. Therefore, it can readily be appreciated that a computer program product including the storage device 210, recording medium 222, and program portions 224–232 falls within the spirit and scope of the invention.

Further, it should be manifest that many other embodiments and variations of this invention may occur to the skilled artisan applying these teachings to a particular problem. One evident variation is the use of the invention in an enterprise system that includes a database system and a filing system (as defined in the Background) that is external to the database system. The invention, therefore, is limited only by the following claims.

---

APPLICATION PROGRAMMING INTERFACE (API) TABLES
C Language Call Level APIs
These describe the APIs 40, 82 in the DBMS 15 of FIGS. 1, 2, 4, & 5
1.0 Concepts and Data Structures Database Instance Name A character string representing an instance of a DBMS. Each DBMS
instance may manage one or more databases. Database instance
names are defined as part of the configuration of a database agent.
Database Name A character string representing a self-contained database that is
being managed by a DBMS instance. Database names must be
unique within a database instance name. Database names are
defined as part of the configuration of a database agent. The
database agent maintains all meta-data on a per-database-name
basis. Furthermore, each database (name) is given its own
transaction management (separate recovery log, separate indexes,
etc.) with the database agent.
Connection A handle that is assigned when a session is established with a
database agent. All subsequent APIs called for the session
must include this handle.
Limits A response structure that is fill-in by the database agent with its
set of parameter limits for a connection (maximum string lengths,
etc.)
TxnId A transaction id number. Transaction identifiers are assigned by
the DBMS, and are passed to the database agent as update actions
are performed. The DBMS assumes the responsibility of coordinating
the two-phase commitment protocol for these transactions.
File Group Name A character string, assigned by the DBMS, that will be used to -continued APPLICATION PROGRAMMING INTERFACE (API) TABLES
C Language Call Level APIs
These describe the APIs 40, 82 in the DBMS 15 of FIGS. 1, 2, 4, & 5
1.0 Concepts and Data Structures refer to groups of files to be placed under the control of the
database agent. Typically the DBMS will map an entire
column of an SQL table to a file group so that all of
the files associated with the group can be deleted as a whole when
the corresponding SQL table is dropped.
GroupGenerationId A 64-bit group generation number assigned by the file
manager. This temporally-unique string is assigned each time a file
group is defined, and is used to properly detect and manage
generations of file groups that have the same name. The string is
also globally unique, and its use is overloaded as a surrogate key for
the file group name.
File Prefix Name A character string that represents a valid prefix for file names
within the database agent's host file system. The prefix name
defines the highest level qualification for location of a file in
the file system. It is defined as part of the configuration of the
database agent itself. For example, on the AIX platform, the prefix
name would be one of the JFS mount point names being managed
by the database agent. On OS/2, the prefix name might be the
"drive letter". For reasons of flexibility the set of legal prefix names
can change from time to time; for example, on AIX, a prefix name
may change to reflect a change in mount point.
PrefixId A 64-bit surrogate key for the file prefix name, assigned by the
database agent. Prefix id numbers are invariant over time
so that files can always be located even when host file systems
are reconfigured.
File Stem Name A character string that represents the remainder of a file name on
the database agent's host file system. The prefix name, together
with the file stem name, uniquely identify a host file. File stem
names may not be changed during the period of time they are being
managed by a database agent.
For example, for a database agent running on the AIX platform:
    prefix name   = mount point name.
    file stem name = remainder of path name within file system.
So, for the file /home/rees/m/x.y in the AIX file system with mount
point /home:
    prefix name   = /home/
    file stem name = rees/m/x.y
Note that the prefix name contains the trailing directory delimiter,
while the file stem name has no leading directory delimiter.
FileGenerationId A 64-bit file generation number assigned by the file
manager. This temporally-unique number is assigned each time a file
is adopted, and is used to properly detect and manage generations
of files that have the same name.
AccCtlMode An enumerated type that describes the type of access control to be
applied to adopted files. One of:
AccCtlNone
    no additional access control is desired.
AccCtlAugmented
    normal host file system access control should be
    augmented with additional access to data managed by
    the database agent.
AccCtlSubsumed
    host file system access control should be fully
    subsumed and managed by.
RecoveryId A time-based recovery identifier, assigned by the DBMS, used for
coordinating advanced recovery features (such as point-in-time
recovery) between the DBMS and the database agent.

-continued

APPLICATION PROGRAMMING INTERFACE (API) TABLES
C Language Call Level APIs
These describe the APIs 40, 82 in the DBMS 15 of FIGS. 1, 2, 4, & 5
1.0 Concepts and Data Structures Authorization Identifier An authorization identification string assigned by the DBMS.
The database agent can be configured with rules that limit the
set of files that can be adopted by a particular authorization
identifier. For example, the database agent can be configured with
a rule such as "DBMS authorization id REES is only allowed to
adopt files in directory /home/rees".

API Table 2.0 Connection Management 2.1 Connect

Purpose:

Establishes a session with a database agent on behalf
of the specified database instance name and database name (within
that instance). The instance name and database name must already
have been configured through normal administration of the file
manager. The hostname is the network name by which the server
is contacted.
If a connection is successfully established then a handle is
returned; this handle should be submitted with all subsequent APIs
for this session.
Syntax:

int Connect( char *hostNamePtr,
           int hostNameLen,
           char *dbInstanceNamePtr,
           int dbInstanceNameLen,
           char *databaseNamePtr,
           int databaseNameLen,
           char *passwordPtr,
           int *passwordLen,
           Connection *handlePtr,
           int *preparedTxnCountPtr );
Parameters:

hostNamePtr
    network host name used to contact the database agent
(network
    protocol dependent).
hostNameLen
    the length of network host name (in characters).
dbInstanceNamePtr
    the database instance name to be associated with the
    session.
dbInstanceNameLen
    the length of the database instance name (in characters).
databaseNamePtr
    the database name (within the database instance) to be
    associated with the session.
databaseNameLen
    the length of the database name (in characters).
passwordPtr
    the password that was assigned when the database
    was configured to the database agent.
passwordLen
    the length of the password (in characters).
handlePtr
    pointer to the handle to be set if a connection is
    successfully established.
preparedTxnCountPtr
    pointer to the variable to be set with the number of
    transactions that are still in the prepared state for this
    database from previous sessions.

-continued

API Table 2.0 Connection Management

Return Codes:

RC_SUCCESS
RC_CONNECTION_FAILED
RC_UNKNOWN_INSTANCE_NAME
RC_UNKNOWN_DATABASE_NAME
RC_PASSWORD_INVALID
Notes:

This version of the API uses simple passwords for
    authentication of DBMS to the database agent.
    If the preparedTxnCountPtr counter is set to value greater than
    zero then the database agent has one or more prepared
transactions
    for this database, from a previous session, that require
    resolution.
    In this case the DBMS should use the QueryPreparedTxns(),
    CommitTxn(), and AbortTxn() APIs to resolve these
    transactions. In addition, no new transactions are permitted
    for this database, from any session, until these previous
    transactions are resolved.
    A DBMS can have multiple simultaneous connections to the
    file manager for the same instance name and database name.
2.2 QueryLimits Purpose:

Obtains the various limits for parameters for this connection as
determined by the database agent.
The caller passes a pointer to a Limits structure, which is
filled-in with parameter limits if the call succeeds. The structure
has the following form:
struct Limits
{
    int maxInstanceNameLen;
    int maxDatabaseNameLen;
    int maxGroupNameLen;
    int maxPrefixNameLen;
    int maxFileStemNameLen;
    int maxAuthIdLen;
    int maxFilesPerAdopt;
    int maxUpdatesPerTxn;
    int maxFilesPerVerify;
};
Syntax:

int QueryLimits ( Connection handle,
             Limits *limitsPtr );
Parameters:

handle
    the handle for the established connection.
limitsPtr
    a pointer to the structure to be filled-in with parameter
    limits.
Return Codes:

DRMRC_SUCCESS
RC_UNKNOWN_CONNECTION
Notes:

If RC_SUCCESS is returned then the following fields are
    set in the Limits structure:
    maxInstanceNameLen
        the maximum length of a database instance name.
    maxDatabaseNameLen
        the maximum length of a database name.
    maxGroupNameLen
        the maximum length of a file group name.
    maxPrefixNameLen
        the maximum length of a file prefix name.
    maxFileStemNameLen
        the maximum length of a file stem name.
    maxAuthIdLen
        the maximum length of an authorization identifier.

-continued

API Table 2.0 Connection Management maxFilesPerAdopt
        the maximum number of files that can be passed per
        call to the AdoptFiles() API.
    maxUpdatesPerTxn
        the maximum number of transactional update API calls
        that can be made within the scope of a single transaction.
    maxFilesPerVerify
        the maximum number of files that can be passed per call
        to the ReconcileVerify() API.
    This API can be called at any time during a session.
    No transaction need be established to call this API.

2.3 Disconnect

Purpose:

Dismantles a connection with a database agent. All
resources associated with the connection are released.
Disconnection always succeeds; any in-flight transactions are rolled back. Any
transactions left in the prepared state must be dealt with during a
subsequent session.
Syntax:

int Disconnect ( Connection handle,
               int *rollbackTxnCountPtr,
               int *preparedTxnCountPtr );
Parameters:

handle
    the handle for the established connection.
rollbackTxnCountPtr
    a pointer to the variable to be set with the number of
    transactions that were in the in-flight state for this
    database at the time of disconnection. This is the number
    of transactions that will be automatically rolled-back by
    the database agent.
preparedTxnCountPtr
    a pointer to the variable to be set with the number of
    transactions left in the prepared state for this database
    at the time of disconnection. These transactions must
    be dealt with during a subsequent session.
Return Codes:

DRMRC_SUCCESS
RC_UNKNOWN_CONNECTION

API Table 3.0 Transaction Management 3.1 BeginTxn

Purpose:

Instructs the database agent to begin a new transaction
and to place the new transaction into the in-flight state.
Syntax:

int BeginTxn ( Connection handle
             TxnId txnId );
Parameters:

handle
    the handle for the established connection.
txnId
    the id of the transaction to be started.
Return Codes:

RC_SUCCESS
RC_UNKNOWN_CONNECTION
RC_TXN_ALREADY_STARTED
RC_NO_RESOURCE_AVAILABLE
RC_UNRESOLVED_TXNS_PRESENT

-continued

API Table 3.0 Transaction Management

Notes:

The transaction id is assigned by the DBMS, and the DBMS
assumes
    responsibility for its coordination.
    The database agent will not start a new transaction if there
    are prepared transactions for this database, from a previous
    session, that require resolution.

3.2 PrepareTxn

Purpose:

Instructs the database agent to prepare to commit an
in-flight transaction. If the database agent votes to proceed with
commitment then it places the transaction into the prepared state.
Syntax:

int PrepareTxn ( Connection handle,
              TxnId txnId );
Parameters:

handle
    the handle for the established connection.
txnId
    the id of the transaction to be prepared for commit.
Return Codes:

RC_SUCCESS
RC_UNKNOWN_CONNECTION
RC_VOTE_ABORT
RC_UNKNOWN_TXN

Notes:

If "success" is returned then the database agent has voted
"commit"
    and has entered the prepared state for this transaction. The
    database agent expects that the DBMS will deliver the final
outcome
    of the transaction with a call to either the Commit() or
    Abort() API. Otherwise, if the outcome can not be made
    available during this session (due to a failure of the DBMS,
    the file manager, or the connection itself) then the call must
    be resolved the next time a connection is established.
    If the database agent votes "abort" for the transaction then it
    automatically rolls the transaction back and discards it; no
    further action is required or expected for this transaction
    in this case.
    This version of the API does not support the "read-only"
optimization
    that eliminates phase 2 of commitment. After voting
    commit, the database agent always expects a commit or abort
    notification during commit phase 2.

3.3 CommitTxn

Purpose:

Instructs the database agent to commit a transaction that
is in the prepared state. The transaction may have been started
within this session, or may be an unresolved transaction from a
previous session.
Syntax:

int CommitTxn ( Connection handle,
              TxnId txnId );
Parameters:

handle
    the handle for the established connection.
txnId
    the id of the transaction to be committed.
Return Codes:

RC_SUCCESS
RC_UNKNOWN_CONNECTION
RC_TXN_NOT_PREPARED
RC_UNKNOWN_TXN

API Table 3.0 Transaction Management 3.4 AbortTxn

Purpose:

Instructs the database agent to abort (and roll back) a
transaction that is either in the in-flight or prepared state.
For prepared transactions, the transaction may have been started
within this session, or may be an unresolved transaction from a
previous session.
Syntax:

int AbortTxn ( Connection handle,
        TxnId txnId );
Parameters:

handle
    the handle for the established connection.
txnId
    the id of the transaction to be aborted (and rolled back).
Return Codes:

RC_SUCCESS
RC_UNKNOWN_CONNECTION
RC_UNKNOWN_TXN
3.5 QueryPreparedTxns()

Purpose:

Obtains a list of all of the transactions known by the database agent
to be in the prepared state.
Syntax:

int QueryPreparedTxns ( Connection handle,
        TxnId list Fσ,
        int listMax,
        int *countPtr );
Parameters:

handle
    the handle for the established connection.
list
    an array of transaction identifiers to be set.
listMax
    the maximum number of transaction identifiers that can
    be returned (the capacity of the array).
countPtr
    a pointer to the variable that is to received the
    number of transactions that are in the prepared state.
    If this value is greater than listMax then the list was
    not large enough to hold the entire list of transaction
    identifiers.
Return Codes:

RC_SUCCESS
RC_UNKNOWN_CONNECTION
RC_TRUNCATED
Notes:

This API can be called at any time during a session.
    No transaction need be established to call this API.
    If RC_TRUNCATED is returned then the capacity of the list
    that was provided on the API call was insufficient to hold the
    entire list. The caller should invoke the API again with a list
    at least as large as the returned "count".

API Table 4.0 File Group Management 4.1 DefineGroup

Purpose:

Defines a named group of files, within a database, to be managed
by a database agent. The specified group name must be
unique within the instance name and database name. The instance
name and database name are determined by the context of the
session.
If the creation of the new group is successful then a generation
number, known as a group generation id, is assigned by the file
manager and returned. The group generation id must be presented
when a new file is adopted under this group, or when the group itself
is deleted.
Syntax:

int DefineGroup ( Connection handle,
        TxnId txnId,
        char *groupNamePtr,
        int groupNameLen,
        GroupGenerationId *groupGenIdPtr );
Parameters:

handle
    the handle for the established connection.
txnId
    the id of the transaction under which the action should be
    performed.
groupNamePtr
    the name of the new group to be defined.
groupNameLen
    the length of the group name (in characters).
groupGenIdPtr
    a pointer to the variable that is to receive the
    group generation number assigned by the database agent if
the
    creation of the new group is successful.
Return Codes:

DRMRC_SUCCESS
RC_UNKNOWN_CONNECTION
RC_UNKNOWN_TXN
RC_TXN_ALREADY_PREPARED
RC_GROUP_ALREADY_DEFINED
Notes:

Each group generation id is temporally unique with respect
    to the instance name and database name. That is, if a given
    group name is deleted and then recreated, then upon recreation
    it will be assigned a generation number that is larger than the
    previous generation number that group name.
4.2 DeleteGroup Purpose:

Deletes a file group and all of the files adopted under it.
The instance name and database name are determined by the
context of the session.
The deletion of the file group occurs in two phases. First, the
file group is marked deleted under the caller's transaction.
Then, when the caller's transaction commits, the database agent
begins a background process that unadopts all of the files that
were adopted under the file group.
Once the deleting transaction commits the group name (and
associated group generation id) are no longer visible through the API.
Syntax:

int DeleteGroup ( Connection handle,
        TxnId txnId,
        GroupGenerationId groupGenId,
        int deleteData );
Parameters:

handle
    the handle for the established connection.
txnId
    the id of the transaction under which the action should be
    performed.
groupGenId
    the generation id number of the group to be deleted.
deleteData
    a flag indicating how the data associated with each -continued API Table 4.0 File Group Management file in the group should be handled. If set to zero,
then files are unadopted only and are returned to the
host file system. If set to one, then the files themselves
are deleted from the host file system in addition to
being unadopted.
Return Codes:

DRMRC_SUCCESS
RC_UNKNOWN_CONNECTION
RC_UNKNOWN_TXN
RC_TXN_ALREADY_PREPARED
RC_GROUP_NOT_DEFINED

API Table 5.0 File Name Prefix Management 5.1 ResolvePrefixName

Purpose:

Obtains the prefix id number that corresponds to one of the valid
file name prefixes for which the database agent has been configured.
The instance name and database name are determined by the
context of the session.
The file name prefix specifies a platform-dependent file location
within the database agent's host file system (mount point name,
drive letter, etc.)
Syntax:

int ResolvePrefixName ( Connection handle,
              char *prefixNamePtr,
              char *prefixNameLen,
              PrefixId *prefixIdPtr );
Parameters:

handle
    the handle for the established connection.
prefixNamePtr
    the prefix name to be resolved.
prefixNameLen
    the length of the prefix name (in characters).
prefixIdPtr
    a pointer to the variable that is to receive the
    database agent's corresponding prefix id number.
Return Codes:

DRMRC_SUCCESS
RC_UNKNOWN_CONNECTION
RC_PREFIX_NOT_DEFINED
Notes:

The prefix name and file stem name together uniquely identify
    a file on the database agent's host file system.
    Prefix names can change over time based on file system
    management requirements at the database agent. Prefix id
numbers,
    however, are invariant over time.
    This API need not be called under a transaction.
5.2 ResolvePrefixId Purpose:

Obtains the current prefix name that corresponds to the specified
prefix id number. The instance name and database name are
determined by the context of the session.
The returned prefix name is the current one that should be used by
any client that requires access to a file managed by
Syntax:

int ResolvePrefixId ( Connection handle,
              PrefixId prefixId,
              char *prefixNameBuf,
              int bufSize, -continued API Table 5.0 File Name Prefix Management int *prefixNameLenPtr );
Parameters:

handle
    the handle for the established connection.
prefixId
    the prefix id number to be resolved.
prefixNameBuf
    a pointer to the buffer that is to receive the current
    database agent prefix name associated with this prefix id.
bufSize
    the size of the buffer.
prefixNameLenPtr
    a pointer to the variable to receive the length of the
    returned prefix name. If the returned length is greater
    than the size of the buffer then the name was truncated.
Return Codes:

DRMRC_SUCCESS
RC_UNKNOWN_CONNECTION
RC_PREFIXID_NOT_DEFINED
Notes:

Prefix names can change over time based on file system
    management requirements at the database agent. Prefix id
numbers,
    however, are invariant over time.
    This API need not be called under a transaction.

API Table 6.0 File Management 6.1 LinkFile

Purpose:

Links one or more host file system files and places them under the
control of the database agent. The specified group generation
identifier, which applies to each of the files, must represent a file
group that has already been created via the CreateGroup() API.
The instance name and database name are determined by the
context of the session.
Each file is identified by its prefix identifier and file stem name.
All of files must belong to the same file group. The same access
control specification, read-only option, and recovery identifier
are applied to each of the files.
The caller provides a file list as an array of LinkItem
structures. Each structure has the following form:
struct LinkItem
{
    PrefixId          prefixId;
    char              *fileStemNamePtr;
    int               fileStemNameLen;
    int               resultCode;
    unsigned long     fileSize;
    FileGenerationId  fileGenId;
}
The caller sets the prefix identifier and file stem name for each file
in the list. The result code for the linkage of each file is returned
in the "result code" field, and, if the linkage is successful, the
file's size (in bytes) is returned in the "fileSize" field, and the
the file generation identifier is returned in the "fileGenId" field.
Syntax:

int LinkFile ( Connection handle,
          TxnId txnId,
          char authIdPtr,
          int authIdLen,
          GroupGenerationId groupGenId,
          LinkItem itemList [],

API Table 6.0 File Management

```
            int itemCount,
            AccCtlMode accessCtl,
            int readOnly,
            RecoveryId recoveryId );
Parameters:

handle
    the handle for the established connection.
txnId
    the id of the transaction under which the action should be
    performed.
authIdPtr
    the authorization id that is performing the linkage.
authIdLen
    length of the authorization id string (in characters).
groupGenId
    the generation id number of the file group under which the
    files are to be linked.
itemList
    an array of LinkItem structures representing the files
    to be linked.
itemCount
    the number of items in the list.
accessCtl
    the type of access control to be applied to each of the
    linked files:
    AccCtlNone
            no additional access control is desired.
    AccCtlAugmented
            normal host file system access control should be
            augmented with access control.
    AccCtlSubsumed
            host file system access control should be fully
            subsumed by access control.
readOnly
    a flag indicating whether or not the files are to be
    maintained in the read-only state by the database agent
    (1 = yes, 0 = no).
recoveryId
    a time-based recovery identifier, assigned by the DBMS,
    known as the "recovery id at linkage". The linked files
    will be tagged with this identifier; the identifier can then
    be used subsequently to support advanced data recovery
    features (such as point-in-time recovery).
Return Codes:

DRMRC_SUCCESS
RC_UNKNOWN_CONNECTION
RC_UNKNOWN_TXN
RC_TXN_ALREADY_PREPARED
RC_NOT_AUTHORIZED
RC_GROUP_NOT_DEFINED
Notes:

A file may only be linked by one database instance at a time.
    Furthermore, because multiple references to linked files are
    not supported, the DBMS should ensure that, for example,
    only one tuple contains a reference to a particular linked
    file.
    If RC_SUCCESS is returned then the caller should examine
    the "resultCode" field of the LinkItem structure, which will
    contain one of the following codes:
        _LINK_OK
            linkage was successful.
        _LINK_PREFIX_NOT_DEFINED
            the specified file prefix identifier has not been defined.
        _LINK_FILE_ALREADY_LINKED
            the specified file is already in the linked state.
        _LINK_HOST_FILE_NOT_FOUND
            the specified file was not found on the host file system.
6.2 UnlinkFile Purpose:

Returns a file to the host file system after having been linked.
The instance name and database name are determined by the
context of the session. The prefix id must be one of the valid prefix
identifiers that has been assigned by the database agent.
In order to support coordinated point-in-time recovery with the
DBMS, the database agent, rather than deleting its information about
the linked file, retains the information and places the file into
the "soft deleted" state.
The caller can optionally request that the file itself be deleted
from the host file system as a part of the unlinkage process.
Syntax:

int UnlinkFile ( Connection handle,
            TxnId txnId,
            PrefixId prefixId,
            char *fileStemNamePtr,
            int fileStemNameLen,
            FileGenerationId fileGenId,
            RecoveryId recoveryId,
            int deleteData );
Parameters:

handle
    the handle for the established connection.
txnId
    the id of the transaction under which the action should be
    performed.
prefixId
    the prefix id number assigned by the database agent.
fileStemNamePtr
    the fixed part of the name of the host file to be unlinked.
fileStemNameLen
    the length of the file stem name, in characters.
fileGenId
    the file generation identifier that was assigned by the
    database agent.
recoveryId
    a time-based recovery identifier, assigned by the DBMS,
    known as the "recovery id at unlinkage".
    The file will be tagged with this identifier and
    placed into the "soft deleted" state; the identifier can
    then be used subsequently to support advanced data
    recovery
    features (such as point-in-time recovery).
deleteData
    a flag indicating how the file itself should be handled.
    If set to zero then files are unlinked only and are
    returned intact to the host file system. If set to one,
    then the files themselves are deleted from the host file
    system in addition to being unlinked.
Return Codes:

DRMRC_SUCCESS
RC_UNKNOWN_CONNECTION
RC_UNKNOWN_TXN
RC_TXN_ALREADY_PREPARED
RC_PREFIX_NOT_DEFINED
RC_FILE_NOT_LINKED
```

API Table 7.0 Data Recovery 7.1 PurgeFiles

Purpose:

Deletes all files that are in the linked state, for the specified
file group, that have "recovery identifier at linkage" greater than
the specified recovery identifier. The instance name and database
name are determined from the context of the session.
Syntax:

```
int PurgeFiles ( Connection handle,
            char *groupNamePtr,
            int groupNameLen,
            GroupGenerationid groupGenId,
```

-continued

API Table 7.0 Data Recovery

RecoveryId recoveryId );
Parameters:

handle
    the handle for the established connection.
groupNamePtr
    the name of the file group.
groupNameLen
    the length of the group name (in characters).
groupGenId
    the group generation id assigned by the database agent.
recoveryId
    the time-based recovery identifier to be compared with the
    "recovery identifier at linkage" for each file.
Return Codes:

DRMRC_SUCCESS
RC_UNKNOWN_CONNECTION
RC_GROUP_NOT_DEFINED
RC_PURGE_ALREADY_IN_PROGRESS
RC_RELINK_ALREADY_IN_PROGRESS
7.2 ReLinkFiles Purpose:

Changes the state of all files from "soft deleted" to "linked", for
the specified file group, that have "recovery identifier at
unlinkage" greater than the specified recovery identifier, and that
have "recovery id at linkage" less than or equal to the specified
recovery identifier. The instance name and database name are
determined from the context of the session.
Syntax:

int ReLinkFiles ( Connection handle,
              char *groupNamePtr,
              int groupNameLen,
              GroupGenerationId groupGenId,
              RecoveryId recoveryId );
Parameters:

handle
    the handle for the established connection.
groupNamePtr
    the name of the file group.
groupNameLen
    the length of the group name (in characters).
groupGenId
    the group generation id assigned by the database agent.
recoveryId
    the time-based recovery identifier to be compared with the
    recovery identifiers for each file.
Return Codes:

DRMRC_SUCCESS
RC_UNKNOWN_CONNECTION
RC_PURGE_ALREADY_IN_PROGRESS
RC_RELINK_ALREADY_IN_PROGRESS

API Table 8.0 Reconciliation 8.1 ReconcileStart

Purpose:

Begins a new reconciliation process between the DBMS and the
database agent for the specified file group (the instance name and
database name are determined from the context of the session).
If the reconciliation process is successfully started then a
"reconcile process handle" is returned. This handle should be
passed on subsequent API calls for the reconciliation process.

-continued

API Table 8.0 Reconciliation

Syntax:

int ReconcileStart ( Connection connectHandle,
              char *groupNamePtr,
              int groupNameLen,
              int relink,
              ReconcileHandle *reconHandlePtr );
Parameters:

connectHandle
    the handle for the established connection.
groupNamePtr
    the name of the file group to be reconciled.
groupNameLen
    the length of the group name (in characters).
relink
    a flag indicating whether files found in the "soft deleted"
    state should be re-linked (1 = yes, 0 = no).
reconHandlePtr
    a pointer to the reconciliation handle that is set if the
    process is successfully started.
Return Codes:

DRMRC_SUCCESS
RC_UNKNOWN_CONNECTION
RC_GROUP_NOT_DEFINED
RC_RECONCILE_IN_PROGRESS
8.2 ReconcileContinue Purpose:

Resumes a incomplete reconciliation process between the DBMS
and the database agent for the specified file group (the instance
name and database name are determined from the context of the
session).
If the reconciliation process is successfully resumed then a
"reconcile process handle" is returned. This handle should be
passed on subsequent API calls for the reconciliation process.
Syntax:

int ReconcileContinue ( Connection connectHandle,
              char *groupNamePtr,
              int groupNameLen,
              int relink,
              ReconcileHandle *handlePtr );
Parameters:

connectHandle
    the handle for the established connection.
groupNamePtr
    the name of the file group to be reconciled.
groupNameLen
    the length of the group name (in characters).
relink
    a flag indicating whether files found in the "soft deleted"
    state should be re-linked (1 = yes, 0 = no).
handlePtr
    a pointer to the reconciliation handle that is set if the
    process is successfully started.
Return Codes:

DRMRC_SUCCESS
RC_UNKNOWN_CONNECTION
RC_GROUP_NOT_DEFINED
RC_RECONCILE_NOT_IN_PROGRESS
8.3 ReconcileVerify Purpose:

Specified a list of files to be verified for the current
reconciliation process.
Each file is identified by its prefix identifier and file stem name.
All of files must belong to the same file group, and the group must
be the one that is being reconciled (the instance name and database
name are determined from the context of the session).
The caller provides a file list as an array of VerifyItem
structures. Each structure has the following form:

API Table 8.0 Reconciliation

```
struct VerifyItem
{
    PrefixId          prefixId;
    char              *fileStemNamePtr;
    int               fileStemNameLen;
    FileGenerationId  fileGenId;
    unsigned long     tag;
    int               resultCode;
}
```
The caller sets the prefix identifier, file stem name, and file generation id for each file in the list. The "tag" field can optionally be set by the DBMS to help identify the files in the list after the invoking the API (the database agent will ignore this field).
The database agent verifies each file by checking its meta-data. The result of this check is indicated through the "result code" field of the file list item.
Syntax:

```
int ReconcileVerify ( Connection connectHandle,
                ReconcileHandle reconHandle,
                VerifyItem itemList [],
                int itemCount );
```
Parameters:

connectHandle
    the handle for the established connection.
reconHandle
    the handle for the reconciliation process.
itemList
    an array of items representing files to be verified.
itemCount
    the number of items in the array.
Return Codes:

DRMRC_SUCCESS
RC_UNKNOWN_CONNECTION
RC_MAX_RECON_ITEMS_EXCEEDED
Notes:

If RC_SUCCESS is returned then the caller should examine the "resultCode" field of the VerifyItem structure, which will contain one of the following codes:
    _VERIFY_OK
        file was found in the linked state; no action taken.
    _VERIFY_RELINK_REQUIRED
        file was found in the "soft deleted" state, but was not linked because the reconciliation process was not started with "re-link" option.
    _VERIFY_RELINK_FAILED
        file was found in the "soft deleted" state, but re-linkage failed due to some problem related to the host file system (file already exists, etc).
    _VERIFY_FILE_NOT_FOUND
        the database agent has no record of the file in the file group being reconciled.
8.4 ReconcileCheckpoint Purpose:

Causes the database agent to checkpoint all updates made on behalf of
the current reconciliation process.
Syntax:

```
int ReconcileCheckpoint ( Connection connectHandle,
                ReconcileHandle reconHandle );
```
Parameters:

connectHandle
    the handle for the established connection.
reconHandle
    the handle for the reconciliation process.
Return Codes:

DRMRC_SUCCESS
RC_UNKNOWN_CONNECTION
RC_CHECKPOINT_ERROR
8.5 ReconcileEnd

Purpose:

Ends the current reconciliation process by either committing it or cancelling it.
Syntax:

```
int ReconcileEnd ( Connection connectHandle,
                ReconcileHandle reconHandle,
                int cancelFlag );
```
Parameters:

connectHandle
    the handle for the established connection.
reconHandle
    the handle for the reconciliation process.
cancelFlag
    a flag indicating if the process should be cancelled rather than committed (1 = yes, 0 = no).
Return Codes:

DRMRC_SUCCESS
RC_UNKNOWN_CONNECTION
RC_RECONCILE_COMMIT_FAILED

We claims:

1. A method for accessing file objects from a client application using a database system, the file objects being stored in a system for filing data (filing system), the method comprising the steps of:

creating a connection between the database system and the filing system for exchange of information between the database system and the filing system respecting file objects in the filing system;

defining a data type in the database system for reference to file objects in the filing system (EFR data type);

entering data into the database system which includes an EFR data type field that contains a reference to a file object in the filing system; and providing control information on the connection between the database system and the filing system which causes the filing system to control processing of the file object according to referential integrity constraints established at the database system.

2. The method of claim 1, wherein the client application includes a first interface with the database system and a second interface with the filing system, further including the steps of:

providing a request from the client application to the database system through the first interface for retrieval of an entry which includes a reference to the file object;

providing a response from the database system through the first interface that includes the reference to the file object; and obtaining the file object from the filing system through the second interface using the reference.

3. The method of claim 2, further including the step of:

prior to the step of obtaining, providing a request from the client application through the second interface for access to the file object, the request including the reference to the file object.

4. The method of claim 3, wherein:

the step of providing a response from the database system includes generating a token denoting access authorization of the database system to file objects in the filing system, and appending the token to the reference, the response including the reference and appended token;

in the step of providing a request from the client application through the second interface, the request includes the reference and appended token; and the step of obtaining the file object is preceded by the step of authorizing access to the file by the client application in response to the token.

5. The method of claim 1, further including the following steps, performed in the filing system:

receiving a request from a user of the filing system to rename or delete the file object; and rejecting the request in response to the control information.

6. The method of claim 1, further including the steps of:

defining a relation over the EFR data type, the relation being represented by a table including a column defined over the EFR data type; and providing a group identification on the connection between the database system and the filing system, the group identification for identifying any file object referenced in the column.

7. The method of claim 6, wherein the step of entering data includes entering a plurality of tuples in the table, each tuple including EFR data in a field of the column which references a file object in the filing system, and the step of providing control information includes providing identification of each file object referenced in the column, each identification including the group identification.

8. The method of claim 7, further including the steps of:

deleting the relation from the database system; followed by, returning control of file objects referenced in the column to the filing system by deleting the referential integrity constraints for the file objects at the filing system in response to a request from the database system; or deleting file objects referenced in the column from the filing system in response to a request from the database system.

9. The method of claim 8, further including:

deleting the data from the database system; followed by returning control of the file object referenced in the EFR data type field to the filing system by deleting the referential integrity constraints with respect to the file object at the filing system in response to a request from the database system; or deleting the file object referenced in the EFR data type field from the filing system in response to a request from the database system.

10. The method of claim 1, further including:

deleting the data from the database system; followed by returning control of the file object referenced in the EFR data type field to the filing system by deleting the referential integrity constraints with respect to the file object at the filing system in response to a request from the database system; or deleting the file object referenced in the EFR data type field from the filing system in response to a request from the database system.

11. A combination for accessing file objects from a client application using a database system, the file objects being stored in a system for filing data (filing system), the combination comprising:

means for creating a connection between the database system and the filing system;

means for defining a data type in the database system for reference to file objects in the filing system (EFR data type); and means responsive to an entry in the database system which includes a reference of the EFR data type to a file object in the filing system for providing control information on the connection which causes the filing system to control processing of the file object according to constraints established at the database system.

12. The combination of claim 11 further including:

a first interface between the client application and the database system for provision of database access requests which include references to file objects in the filing system and for receipt of responses from the database system that include references to file objects in the filing system; and a second interface between the client application and the filing system for obtaining file objects from the filing system using references provided through the first interface.

13. The combination of claim 12, further including:

means in the database system for generating a unique token denoting access authorization of the database system to file objects in the filing system; and means in the filing system for authorizing access to file objects in the filing system through the second interface in response to a unique token generated in the database system.

14. The combination of claim 11, further including means in the filing system responsive to the control information for rejecting requests from filing system users to rename or delete the file object.

15. The combination of claim 11, further including:

means in the database system for defining a relation over the EFR data type, the relation being represented by a table including a column defined over the EFR data type; and means in the database system for providing a group identification on the connection between the database system and the filing system, the group identification system for identifying every file object referenced in the column.

16. The combination of claim 15, further including:

means in the database system for entering a plurality of tuples in the table, each tuple including EFR data in a field of the column which references a file object in the filing system; and the means for providing control information having means for providing identification of each file object referenced in the column, the identification including the group identification.

17. The combination of claim 16, further including:

means in the database system for deleting the relationship from the database system;

means for returning control of file objects referenced in the column to the filing system by deleting the referential integrity constraints with respect to the file objects at the filing system, or by deleting file objects referenced in the column from the filing system.

18. The combination of claim 17, further including:

means in the database system for deleting the entry from the database system; and means responsive to deletion of the entry for returning control of the file object referenced in the entry to the filing system by deleting the referential integrity constraints with respect to the file object at the filing system, or by deleting the file object from the filing system.

19. A computer program product, comprising:
   a computer usable medium having computer readable program code means embodied thereon for enabling a database system to reference file objects stored in a system for filing data (a filing system);
   a first computer readable program code means embodied in the medium for casing the database system to create a connection with a filing system for exchange of information between the database system and the filing system respecting file objects in the filing system;
   a second computer readable program code means embodied in the medium for defining a data type in the database system for reference to file objects in the filing system (EFR data type); and
   a third computer readable program code means embodied in the medium for providing control information on the connection between the database system and the filing system which causes the filing system to control processing of a file object in response to an entry into the database system that includes data of an EFR data type referencing a file object in the filing system.

20. The computer program product of claim 19, further including:
   fourth computer readable program code means embodied in the medium for providing a group identification on the connection between the database system and the filing system, the group identification for identifying any file object referenced in a column defined in the database system over the EFR data type included in a table representing a relation of the database system.

21. A computer program product, comprising:
   a computer useable medium having computer readable program code means embodied thereon for enabling a database system to reference file objects stored in a system for filing data (filing system);
   a computer readable code means embodied on the medium for causing a database system to define a data type that references file objects in the filing system that is external to the database system; and
   a computer command code means embodied on the medium for directing the filing system to prevent renaming or deletion of a file object in the filing system that is referenced in an entry in the database system by data of the data type.

22. The method of claim 1, wherein the file objects are files.

23. The method of claim 1, wherein the file objects are bit files.

24. The combination of claim 11, wherein the file objects are files.

25. The combination of claim 11, wherein the file objects are bit files.

26. The computer program product of claim 19, wherein the file objects are files.

27. The computer program product of claim 19, wherein the file objects are bit files.

28. The computer program product of claim 21, wherein the file objects are files.

29. The computer program product of claim 21, wherein the file objects are bit files.

\* \* \* \* \*